US008494937B2

(12) United States Patent
Berntsen et al.

(10) Patent No.: US 8,494,937 B2
(45) Date of Patent: Jul. 23, 2013

(54) METHOD, SYSTEM AND APPARATUS FOR THE ESTABLISHMENT OF A VIRTUAL BANKING ENVIRONMENT IN A MERCHANT VENUE WHILE INCREASING THE DEPOSIT-BASED ASSETS OF OPTIONALLY INTERFACED TRADITIONAL BANKING INSTITUTIONS SUBJECT TO FRACTIONAL-RESERVE BANKING

(75) Inventors: William O. Berntsen, Whitehouse Station, NJ (US); Lawrence P. Casey, Annandale, NJ (US)

(73) Assignee: Th Financial Services, Ltd., Whitehouse Station, NJ (US)

( * ) Notice: Subject to any disclaimer, the term of this patent is extended or adjusted under 35 U.S.C. 154(b) by 58 days.

(21) Appl. No.: 12/925,688

(22) Filed: Oct. 27, 2010

(65) Prior Publication Data
US 2011/0112964 A1 May 12, 2011

Related U.S. Application Data

(63) Continuation-in-part of application No. 11/895,981, filed on Aug. 28, 2007, now abandoned.

(60) Provisional application No. 60/853,866, filed on Oct. 24, 2006.

(51) Int. Cl.
G06Q 20/10 (2012.01)
G06Q 20/04 (2012.01)
G06Q 20/105 (2006.01)
G06Q 20/1085 (2006.01)
G07F 19/20 (2006.01)

(52) U.S. Cl.
USPC ............... 705/35; 705/39; 705/44; 235/379; 235/380

(58) Field of Classification Search
USPC ............... 705/14, 35, 39, 41, 43, 44, 45, 66, 705/67; 235/379, 380, 382
See application file for complete search history.

(56) References Cited

U.S. PATENT DOCUMENTS

| 5,869,826 | A * | 2/1999 | Eleftheriou | ........... 235/380 |
| 5,949,880 | A * | 9/1999 | Curry et al. | ............. 705/66 |
| 6,536,663 | B1 * | 3/2003 | Lozier et al. | ........... 235/379 |
| 6,941,285 | B2 * | 9/2005 | Sarcanin | ................. 705/67 |

(Continued)

OTHER PUBLICATIONS

•Murray N. Rothbard, Fractional Reserve Banking: Part II, vol. 45, Issue 10, The Freeman/ Ideas on Liberty, Oct. 1995 (hereinafter referred to as "Rothbard").*

*Primary Examiner* — Daniel Felten
*Assistant Examiner* — Barbara Amelunxen
(74) *Attorney, Agent, or Firm* — Mitchell A. Stein, Esq.

(57) ABSTRACT

A system incorporating method and associated apparatus for establishing virtual banking in a merchant venue or syndication of merchants for one or more consumers in a manner that increases the deposit-based assets of a related traditional banking institution by loading transactions of fractional currency amounts, preferably reflecting the acquisition of physical fractional currency, and more preferably coinage, and thereupon enabling inter-merchant (or syndicate) commercial transactions, including purchases and sales, in a manner that does not deplete deposit-based assets. Commercial transactions are at the direction of consumer(s) each with their own portable device linked to a merchant-hosted virtual account that maintains transaction details, histories and balances, and transmits data reflecting the same to the portable device(s) where it is recorded and displayed, upon demand. Also included are devices for executing commercial transactions with the portable device(s) and transmitting appropriate data to each bank and virtual account.

13 Claims, 11 Drawing Sheets

U.S. PATENT DOCUMENTS

| | | | |
|---|---|---|---|
| 7,319,987 B1 * | 1/2008 | Hoffman et al. | 705/44 |
| 7,440,924 B2 * | 10/2008 | Buchanan et al. | 705/45 |
| 7,644,039 B1 * | 1/2010 | Magee et al. | 705/43 |
| 2003/0009402 A1 * | 1/2003 | Mullen et al. | 705/35 |
| 2004/0020984 A1 * | 2/2004 | Clark | 235/382 |
| 2004/0260607 A1 * | 12/2004 | Robbins et al. | 705/14 |
| 2005/0177497 A1 * | 8/2005 | Takahashi | 705/39 |
| 2006/0136299 A1 * | 6/2006 | Ruhmkorf | 705/14 |
| 2006/0213978 A1 * | 9/2006 | Geller et al. | 235/380 |
| 2006/0249570 A1 * | 11/2006 | Seifert et al. | 235/380 |
| 2006/0259364 A1 * | 11/2006 | Strock et al. | 705/14 |
| 2007/0016505 A1 * | 1/2007 | Shebson et al. | 705/35 |
| 2007/0125838 A1 * | 6/2007 | Law et al. | 235/379 |
| 2008/0078831 A1 * | 4/2008 | Johnson et al. | 235/380 |
| 2008/0162350 A1 * | 7/2008 | Allen-Rouman et al. | 705/44 |
| 2009/0192936 A1 * | 7/2009 | Takahashi | 705/41 |
| 2009/0266879 A1 * | 10/2009 | Gustin et al. | 235/379 |

* cited by examiner (Portable Device)

(Node Device)

(Exploded Side View of Portable Device)

(Exploded Back View of Portable Device)

(Bottom View of Portable Device)

(Side View of Portable Device)

(Front View of Portable Device)

METHOD, SYSTEM AND APPARATUS FOR THE ESTABLISHMENT OF A VIRTUAL BANKING ENVIRONMENT IN A MERCHANT VENUE WHILE INCREASING THE DEPOSIT-BASED ASSETS OF OPTIONALLY INTERFACED TRADITIONAL BANKING INSTITUTIONS SUBJECT TO FRACTIONAL-RESERVE BANKING

CONTINUING DATA/CROSS-REFERENCE TO RELATED PROVISIONAL

This application incorporates by reference and claims the benefit of the common subject matter, content and earlier filing date of U.S. Provisional Application No. 60/853,866, dated Oct. 24, 2006, pursuant to 35 U.S.C. §119(e) as well as U.S. Ser. No. 11/789,260 filed Apr. 24, 2007, which has matured into U.S. Pat. No. 7,778,923, and its continuation in U.S. Ser. No. 11/895,981, of which this is a continuation-in-part.

FIELD OF THE INVENTION

The present invention relates to the field of methods, systems and apparatus for the creation of a virtual banking environment in a merchant venue, such that a merchant may act in a legally cognizable capacity akin to that of a sponsoring company, and offer and provide consumers an array of commercial transactions for the acquisition of goods and services performed without physical currency or need for such consumers to be banked, thereby attracting the full population, including the unbanked and underbanked, in a manner that increases banking reserves and fractional-reserve banking.

BACKGROUND OF THE INVENTION

The world of financial transactions is generally dominated by banks at almost every level, confining commercial activities of merchants and charging hefty transactional fees in a fashion that has grown largely electronic and automated. Merchants are charged to courier in fractional metallic currency, as they are charged to courier out fractional paper currency. Merchants are charged for wire transactions whether debited directly from a consumer account or through a credit system. In the end, merchant to consumer commerce pays a large fee not for the goods or services warehoused, advertised, delivered and exchanged, but for each transaction, deposit, withdrawal, electronic exchange, and physical currency exchange. Merchants cater to all levels of customers, from those who rely on credit or debit cards linked to bank accounts, through those that are, by choice or exclusion, relegated to the world of the so-called "unbanked" and "underbanked."

The economic need and drive, shared by competitive merchants and consumers, to minimize transactional and banking expenses that add little to the quality of goods and services delivered but reduce profits and increase costs, has collided with the traditional notions of banking in this electronic era. The necessity to have "credit cards" for purchases, which carry the largest costs in fees to merchants and consumers alike, has given way to the use of debit cards in lieu of currency itself. While "good credit" and a banking history are both prerequisites to receiving a "credit card," only a banking history is needed for the use of "debit cards." Yet, debit card transactions carry bank-regulated transaction fees, and are generally not employable by the increasing number of so-called "unbanked" and "underbanked." The "stored value card" has emerged as a transactional medium that crosses all socio-economic divides, is viable for the vast amount of consumer transactions, and carries few if any transactional fees typically associated with both credit and debit cards.

Additionally, driven by this changing marketplace and enhanced by the strides in computer technology, data communication and storage, banks and large-scale merchants can easily provide a whole panoply of overlapping transactional services, but are largely impeded by a system that appears to hold firmly to a legally-imposed banking monopoly, rooted in its original need to process tangible fractional currency, now appearing archaic to the objective technologist yet customary in the anthropological view of the human form of commercial exchange. The instant invention seeks to bridge the legal/technological/anthropological gap to provide a merchant-based venue, where the merchant hosts a plurality of commercial activities from the sale of goods and services through "virtual" banking, without the necessity to employ an institutional "bank" except where required, and in a manner that simply satisfies its basic need to increase its demand deposit account amounts and thereby increase its fractional reserve basis and lending ability in accordance with the fractional reserve system. Among the elements of import lie the enormous volume of merchant-related activities—from sale of goods and services, through check-cashing, bill payment, money orders, ATM functions, money transfers, credit cards, debit cards, gift cards and the like, and the impact upon the world of the "unbanked" or "underbanked." In 2008, those who have no bank accounts (the "unbanked") and those who may have access to some banking services yet do not generally use the same (the "underbanked"), together comprise, as one source reports, an estimated 73 million of 208 million income-earning American households (approximately 33.2% of all) relegated to living on the essential fringes of the banking world, but all central to the world of commercial transactions. ("The CFSI Underbanked Consumer Study Underbanked Consumer Overview & Market Segments Fact Sheet, Jun. 8, 2008, http://cfsinnovation.com/system/files/imported/managed_documents/underbankedconsumerstudy-_factsheet.pdf; and "Highlights from the 3$^{rd}$ Annual Underbanked Financial Services Forum, New Approaches, New Understanding, New Relationships," Berke, Sarah, Lopez-Fernandini, Alejandra, Herrmann, Michael J., CFSI 2008.) While the volume of money that passes through this class is large, it also comprises bulky physical fractional currency. Thus, banks cannot utilize such money (as it rarely navigates to demand deposit accounts but rather appears to be in "circulation"), and merchants must pay to cart the currency about, with little ability to actually grow such households into the world of "bankable" and transactions into the world of electronic. The numbers of members in this class rise, while the solution to blend this group into the traditional banking scenarios has heretofore remained unresolved. It is one of the objects of this invention to provide solution(s) to many of these myriad problems that fall within the rubric of legal structure. Lying behind this array of elements is a fairly well-established, yet unwieldy banking system, including fractional-reserve banking, which has been established over a multiplicity of years, but yearns to grow to meet these newly developing demands. These elements and solutions are explained and integrated herein.

For example, the traditional approach of banks courting savings customers has given way to another reported estimate, still sizeable, that 14% of U.S. income earners, as much as 28 million people, lack in bank accounts, with another 22%, or about 45 million people using banks intermittently. ("The FDIC National Survey of Banks' Efforts to Serve the Unbanked and Underbanked," Dove Consultaing, December 2008, provided to the FDIC, http://www.fdic.gov/unbanked-surveys/.) Such "unbanked" or "underbanked" people nonetheless spend an estimated $11 billion in fees for some 324 million "alternative" financial transactions annually at check-cashing outlets, money-wire companies or other operations, all as reported by the Chicago-based Center for Financial Services Innovation ("CFSI"). Many banks are anxious to capture this customer base, but both customers and banks are concerned with risks inherent in becoming "banked." Typically, such "unbanked" customers use a myriad of check-cashing facilities to liquidate their paychecks and then to use the cash thereby received. Banks and merchants are increasingly establishing facilities to handle these types of transactions, avoid or minimize the fees charged through card-based banking systems and check-cashing services, and make use of data obtained and/or mined therefrom. It is one of many objects of this invention to capture the transactions of these so-called "unbanked" and "underbanked" customers and to provide them with services and statements that are equivalent to, if not better than, those typically provided to the banked, without sacrificing any safeguards. Indeed, in an almost transparent attempt to utilize the enormous volume of sales activities and to avoid the costs of traditional credit card transactions, Wal-Mart sought an application to itself become a bank—an application withdrawn on or about Mar. 16, 2007 for reasons that may appear cloaked, yet, have become clearer. ("Wal-Mart Withdraws Industrial Banking Push, FDIC says retailer 'made a wise choice' not to pursue application for limited banking operations," Kavilanz, Parija B., CNNMoney.com, senior writer, Mar. 16, 2007, http://money.cnn.com/2007/03/16/news/companies/walmart/index.htm.) Upon the heals of withdrawal of the banking application, Wal-Mart announced to its customer base a largely specialized array of services, by using GE Money Bank. Such services include financial services, services for the unbanked and underbanked and money centers. It is unclear the extent of the tie-in to GE Money Bank, although the advantages to all involved are clearly many.

The Office of Regional and Community Affairs of the Federal Reserve Bank of New York released a white paper in August of 2005 which generally indicates the issues confronting the merchant, involved in open and closed loop cards, and implicated under Regulation E (governance of electronic fund transactions, The Federal Reserve Board's Regulation E (12 C.F.R. Part 205) implements the Electronic Fund Transfer Act (15 U.S.C. §1693-1693r)). ("Stored Value Cards as a Method of Electronic Payment for Unbanked Customers," Rhine, Sherrie L. W. and Su, Sabrina, http://www.newyorkfed.org/regional/Stored_Value_Card_Paper_August_2005.pdf.) One of the deeper concerns expressed therein is that the nature of stored value cards ("SVC's") does not permit the consumer to create credit portfolios, resulting, at least in part, from the inability of SVC-based systems to render account statements and maintain transactional information. Indeed, one can well recognize that a simple SVC is but a magnetic sweep means and a code identifier—there is no mechanism by which a consumer who uses such an SVC can know card balance, let alone find and determine account activity, other than by manually maintaining such information externally (e.g., on paper). It is thus an object of the instant invention to satisfy the long felt need in the industry to provide a stored value-styled environment wherein a portable device provides the very equivalents of statements, transactions, histories and balances on demand to the consumer.

It should be further appreciated that whether open (multi-merchant) or closed (merchant-specific) loop, whether a single load or reloadable, the merchant who is afforded the capacity to provide a stored value-styled environment and statement equivalents, transactions, histories and balances to the consumer, also receives the ability to itself become a "sponsoring company," maintaining that data in-house, while supervising/hosting the underlying commercial transactions. Many advantages are gained by further adding an optional interface with a financial institution. Indeed, in "one stop shops" like Wal-Mart, it is easy to recognize the significant value and commercial advantage of the inventive modality that enables the full gamut of customer services equivalent to that of a bank through a multiplicity of "stored value devices" ("SVD's") that enable the execution of stored value-styled transactions and, in comparison to SVC's, enhanced by the provision of, inter alia, statement equivalents on demand offering the necessary predicates to satisfy traditional Regulation E requirements (to the extent applicable), permit the merchant to act as if it were a bank (a "virtual" bank) including, potentially, credit services, where the security for transactions is not necessarily the FDIC (which may consider this a "pass through" and which guarantees now up to $250 k per depositor per bank, Dodd-Frank Wall Street Reform and Consumer Protection Act, Jul. 21, 2010), but is, instead the merchant which can also often securitize a much greater amount. Furthermore, regulatory authority and limits are not fully clear, or even necessarily implicated, where a merchant acts in the capacity of a virtual bank in the provision of a certain panoply of services, perhaps greater in scope and security than an actual regulated bank. That having been stated, however, it is also observable that in such environments, the merchant may very well wish to be tied in with a bank (as Wal-Mart has done with GE Capital) in order to increase fractional-reserve banking opportunities.

It is thus an object of the present invention to provide a virtual banking environment in a merchant location and the option to the merchant of "banking" one or more of its transactions with a regulated banking institution to enable fractional-reserve banking, via a method, system and series of stored value type devices ("SVD's") that provide a plurality of stored value-type services to the consumer while simultaneously giving statement equivalents, transactional information, histories and balances on demand. Indeed, one could well recognize that the instant invention renders the merchant a virtual bank—perhaps without regulation—permitting not just huge opportunity to the "unbanked" and "underbanked" consumer base, but even a potential intrusion into the world of the banked in a significant way, and, at minimum, but itself a maximum business opportunity, actions commensurate with those of a "sponsoring company." Moreover, as shown, inasmuch as the method, system and devices of the instant invention provide "on demand" account information and tracking of all transactions, it is thus an object of the instant invention to enable merchant(s) to act as virtual banks not just targeting the unbanked and underbanked, but likewise viable for the banked.

By way of further background, it should be recognized that customers who are banked, unbanked and underbanked are all sought by the banking community. In the course of any given day, all customers utilize one or more of a composite of mechanisms to perform financial transactions: credit cards, debit cards, stored value cards, checks and cash. As a subclass of the stored value card, "gift cards" (which are "closed loop" and specific to a merchant or group of merchants) are used frequently, as shown by an industry that has arisen with some gathered 54,100,000 Internet sites (2008) offering such gift cards for purchase. Often, as well, merchants create cash checking and ATM scenarios just to take advantage of the marginal float associated therewith.

"Gift cards" are generally themselves a class of "stored value cards" which represent money that has been given to the card issuer for the acquisition of the card which often include not just a pre-determined amount of money to be used on the card, but a cost for the acquisition itself. Importantly, the "sale" of such stored value cards recognizes the revenue of the sale, offset by the liability of the card, resulting in a net of zero for tax and accounting purposes; taxes are incurred only when the card is actually used for commercial transactions. The inherent deferred tax consequences of revenue from sales of cards is itself a significant advantage to the merchant/sponsor, which the SVD's, method and system of the instant invention also capture.

Typical applications of SVC's include transit system cards, prepaid telephone cards, and merchant-specific cards. For example, transit system cards are acquired by passengers to eliminate the handling of money in connection with a transit ride (buses, subways, trains and the like). Of importance among transit system cards—like card usage in general—is the ability to accurately track usage, not just of the transit system, but individual profiles of the user. It is recognized that users are pattern-oriented: taking the same means of transportation at predetermined times daily and purchasing habits are predicable, making the data acquired in connection with card usage itself a valuable commodity. Predictability of the profiled customer usage also plays a key role herein in the advantages that can be obtained in a merchant-based virtual banking environment as well as for fractional-reserve banking, as discussed in greater detail below.

Fundamentally the only difference between a gift card and a stored value card is that the former is a closed loop system. Additionally, the stored value card is reloadable in the sense that additional money can be added thereto at any given time for an additional fee. Gift cards are usually of a predetermined amount provided by a specific merchant. In this sense, in the gift card process all activity remains captive within the specific merchant's environment in which the acquisition of the card has occurred. The broader category of stored value cards still has a predetermined amount—that amount having been provided in order to place the substantial equivalent value on the card—but the system is open in that the card is typically a card that can be used in any location that utilizes the specific card service. In the instant invention, it is the intent to provide the full gamut of services, not just those limited to stored value cards but a full, virtual banking environment, employing stored value devices "SVD's" that operate in conformity with the unregulated aspects of SVC's. In the preferred embodiment, it is the intent to provide an SVD that is like a gift card in the sense that it is a "closed loop" to a merchant or group of merchants acting as a "sponsoring company," is purchased and optionally reloadable with fractional currency, and is part of a system that, when tied to a merchant's demand deposit account at a bank, serves to increase the asset base for fractional reserve banking while enabling a plurality of commercial transactions.

It is important to understand the background of the card industry and its history to recognize the costs associated with the transactions and the driving need by merchants to avoid paying those costs and instead "capture" the entire transaction without having to pay to the card systems employed a percentage-based expense associated with the transaction.

Since the 1980s, Visa U.S.A. (Visa) and MasterCard International (MasterCard), remained the bank-controlled credit card associations that together have accounted for approximately 70 percent of today's credit card market. Financial institutions, have been able to control the use of and access to their fee-based networks to the disadvantage to their merchant members. Recently, however, the credit card industry has been changing in that some merchants are now large enough to exert their own leverage (like Wal-Mart), legal defeats have impeded the ability of credit card associations to control the market, and some participants have developed new arrangements and alliances that may be a prelude to further changes in the industry.

By way of background, merchant credit has been available since virtually the birth of civilization. Yet, the present-day credit card industry in the United States originated in the nineteenth century. In the early 1800s, merchants and financial intermediaries provided credit for agricultural and durable goods, and by the early 1900s, major U.S. hotels and department stores issued paper identification cards to their most valued customers. When a customer presented such a card to a clerk at the issuing establishment, the customer's creditworthiness and status were instantly established. The cards enabled merchants to cement the loyalty of their top customers, and the cardholders benefited by being able to obtain goods and services using preestablished lines of credit. Generally these cards were useful only at one location or within a limited geographic area—an area where local merchants accepted competitors' cards as proof of a customer's creditworthiness.

In 1949, Diners Club established the first general-purpose charge card, enabling its cardholders to purchase goods and services from many different merchants in what soon became a nationwide network. The Diners Club card was meant for high-end customers and was designed to be used for entertainment and travel expenses. Diners Club charged merchants who accepted the card a 7% charge for each transaction. Merchants found that accepting Diners Club cards brought more customers who spent more freely. The Diners Club program proved successful, and in the following decade it spawned many imitators. Certainly, Diners Club created the fundamental notion of a closed loop card that could be used for purchase with merchants who had an established relationship with Diners Club—the issuer—and who paid the fee of 7% of all transactions for the right to accept the card. Each transaction was processed through Diners Club—with no intervening banks or other institutions—hence acting as a closed loop system.

Whether closed or open looped systems, it is well understood that the expansion upon this basic principle has resulted in a huge volume of merchant sales and payments of billions of dollars to the card providers for the "privilege" to accept the cards. Interestingly, the charge per purchase absorbed by the merchant is largely transparent to the customer, who pays the ticket price and tax, but has little to no idea that a significant percentage is paid by the merchant in connection with the transaction. Merchants are thus interested in minimizing the costs associated with accepting credit card transactions, thereby maximizing profits by minimizing the fees associated with such cards—another object of the instant invention.

The industry of charge cards grew from its birth with Diners Club in 1949. In the late 1950's, Bank of America, located on the West Coast, began the first general purpose credit card (as opposed to charge card) program. At that time, banking laws placed severe geographic restrictions on individual banks. Virtually no banks were able to operate across state lines, and additional restrictions existed within many states. Yet for a credit card program to be able to compete with Diners Club, a national presence was important. To increase the number of consumers carrying the card and to reach retailers outside of Bank of America's area of operation, therefore, other banks were given the opportunity to "license" Bank of America's credit card. At first Bank of America operated this network internally. As the network grew, the complexity of interchange—the movement of paper sales slips and settlement payments between member banks—became hard to manage. Furthermore, the more active bank licensees sought greater control over the network's policy making and operational implementation. To accommodate these needs, Bank of America syndicated its credit card operations into a separate entity that evolved into the Visa network of today.

In 1966, in the wake of Bank of America's success, a competing network of banks issuing a rival card was established which thereupon evolved over time into what is now the MasterCard network. In these scenarios, an "open" model is used, in that a bank that issues a card is not necessarily the bank that acquires the transaction. In particular, when a consumer purchases at a merchant, that merchant's banking relationship is considered the acquiring bank, which passes back through the Visa/MasterCard networks, back to the issuing bank—the bank that originally issued the card to the cardholder. Again, from the customer's vantage point, that the issuing bank is different from the acquiring bank (in that the merchant has a banking relationship with a bank other than the issuing bank) is transparent, yet the fees paid not just by the merchants but by the inter-banking systems become sizeable as the volume has increased enormously.

In addition, firms that were not constrained by interstate banking restrictions formed card networks on the single-issuer model (the model established by Diners Club, in which many merchants accept payments on a card with a single issuer and hence had a single relationship with the card provider and/or issuing bank.) For instance, the American Express Company introduced its charge card system in 1958, and Sears, Roebuck and Co. established the Discover Card credit card in 1986. Among the challenges each of these networks faced was bringing together large numbers of cardholders with large numbers of merchants who accepted the cards as payment. Achieving a sufficiently large network was hard, partly because merchants, especially larger retailers, were reluctant to honor credit cards that would compete with their own store-branded credit cards. Some smaller merchants, however, viewed general-purpose credit cards as a way to compete with larger merchants for customers. Merchants of all sizes have traditionally remained averse to having fees imposed on them by the credit card network.

Currently the U.S. credit card industry is a mature market. Today credit cards are widely held by consumers: in 2001 an estimated 76 percent of families had some type of credit card. Recent estimates suggest that among all households with incomes over $30,000, 92 percent hold at least one card, and the average for all households is 6.3 credit cards. Credit cards are also widely accepted by merchants, and with the recent addition of fast-food and convenience stores to the credit card networks, credit card payments are now processed at nearly all retail establishments.

The structure of the credit card industry is also noteworthy. As noted above, the general-purpose card market is dominated by Visa and MasterCard, two bank-controlled card associations. The four major card networks have a variety of corporate structures. Visa is a nonstock for-profit membership corporation that as of 2004 was owned by approximately 14,000 financial-institution members from around the world. Until 2003 MasterCard was a nonstock not-for-profit membership association, but then it converted to a private-share corporation known as MasterCard Inc., with the association's principal members becoming its shareholders. MasterCard has more than 23,000 members (including the members of MasterCard's debit network). The Board of Directors of Visa is elected by the member banks with voting rights based primarily on transaction volume. Control of the Visa and MasterCard card associations is roughly proportional to the transaction volume of member issuing banks. American Express is an independent financial services corporation, and Discover Financial Services is now a subsidiary of investment bank Morgan Stanley Dean Witter & Co. The issuance of credit cards is concentrated among the five banks, now narrowing with the acquisition of MBNA by Bank of America including its subsidiary MBNA America Bank, NA (MBNA), a monoline credit card bank, and Washington Mutual, Inc.'s acquisition of Providian Financial Corporation, including its Providian National Bank, another monoline credit card bank. As the conglomeration has occurred, so too has the consternation of the merchant population discussed further hereinbelow In the industry today, debit cards are also quickly expanding as a product line. Debit transactions reached a record $15.6 billion in 2003. Debit cards are essentially cards that can be used either to directly withdraw cash from cash-dispensing equipment at banks (like ATM's), or can be used as ATM withdrawals at merchant locations, or as credit cards via Visa, MasterCard, or other networks. In the ATM scenario, the amount of a payment made using a debit card is immediately withdrawn from the cardholder's checking account, with the result that, for the card issuer, both the opportunity to earn interest on revolving balances and any inherent credit risk are eliminated. Likewise, when used as a credit card, despite the availability to have the money immediately withdrawn as an ATM-styled transaction, the credit card fee charged by the networks is immediately invoked. (Reasons behind the choice by the consumer are also explained hereinbelow, although the consequential costs are again born by the merchant and largely transparent to the customer.)

The ability to use the Visa and MasterCard networks to post debit transactions was developed in the 1970's, but not until the 1990's was there a significant volume of transactions in these systems. If a merchant has a personal identification number (PIN) entry keypad at its sales location, the transaction is routed like an ATM transaction. In the absence of a keypad, the merchant compels the customer to execute a credit-styled transaction authorization. These transactions then travel through the payment systems like a credit card transaction (except that the cardholder's bank will be informed of the transaction immediately and will be able to hold the customer's funds until settlement is completed).

It should be appreciated that many consumers opt out of the ATM-styled transaction to avoid having to enter their secret PIN number, despite the availability of the entry key pad. Inasmuch as the customer is left to pick without regard to the costs to the merchant, the differing fees charged to merchants for transacting PIN debits and signature debits has became the basis for conflict and resultant litigation.

Interchange fees are set by the card associations and in 2004 were a source of some $25 billion in revenue to card issuers. At the same time, interchange fees are a source of irritation to merchants and can be among the largest and largest-growing costs of doing business for many retailers. A standard interchange fee is around 200 basis points, plus $0.10 per transaction, but many transactions have lower fees and some have higher fees. Large merchants can negotiate directly with the card association for very low interchange fees, but these fees are not publicly circulated.

The pricing structure of interchange fees is complex. The specific interchange fee depends on the card association, the type and size of merchant, the type of card, and the type of transaction. Merchants that sell low-margin items—for example, convenience stores, supermarkets, and warehouse clubs—have lower rates. Hotels and car rental establishments have higher rates. Newer premium credit cards that offer more rewards have high rates. Credit card transactions have higher rates than signature debit card transactions, whose rates are higher than PIN debit card transactions. Sales transacted over the telephone or Internet have higher interchange rates, ostensibly to compensate for the greater risk of fraud associated with transactions that are not conducted in person. There is considerable friction among network participants over the issue of interchange fees, and card associations are being challenged on the structure and application of those fees. Merchants increasingly view interchange fees as an unnecessary and growing cost over which they have no control. Furthermore, banks are now issuing credit cards with even higher interchange fees. Merchants are unable to refuse transactions made with these cards. Therefore, merchants perceive issuing banks as earning revenue at their expense, with no added value to merchants. Merchants pass on the costs of interchange fees to their customers, who are largely unaware of this cost. Thus, it remains an object of the invention to enable commercial transactions between consumers and merchants without the use of physical currency—like that provided by credit and debit cards—but also without the fees and expenses charged for interchange.

Among other factors, the interchange fee structure that favors large merchants over smaller ones is inspiring merchants to challenge the interchange system more actively. Early in 2005, merchants formed a trade association for the purpose of changing interchange fees. In addition, Visa and MasterCard have been forced to defend the interchange arrangement from litigation filed in June 2005 by a group of smaller merchants.

Despite merchant discontent, card issuers have incentives to maintain or increase interchange fees. Issuers are marketing credit cards with reward or loyalty programs that encourage greater card use and reinforce customer loyalty to the brand. An estimated 12 to 24 percent of cards held by consumers have rewards associated with them, and in 2003 an estimated 60 percent of credit card spending was attributed to cards with rewards. Card issuers are funding these increasingly popular reward programs through interchange fees—another loop effectively financed by the merchants.

Thus, it is of no great surprise that merchants seek an alternative mechanism, whereby transactions can occur without the significant fees associated with the networks. To keep the transactions in a closed or even open loop environment, as described further herein, also creates a vast, untapped opportunity for fractional-reserve banking, also discussed hereinbelow. It is thus an additional object of the instant invention to provide such solutions.

It is important to understand the historical role of cash in all transactions as well. It is habitual to consumers that despite the availability of card-based options, quantities cash, defined herein as "physical, fractional currency" (i.e., paper and coinage) remains a primary vehicle for financial transactions. Daily, consumers withdraw cash or receive cash for purchases, whether the purchase is major or incidental.

Yet, as a result of historical underpinnings to such transactions (tax predominantly), the amounts of money involved in such commercial transactions rarely result in whole numbers, but rather include fractions of a dollar. Nor are such transactions rounded to the nearest paper value (like a dollar, for instance) but rather to the penney (one hundredth of a dollar), as the perception of the consumer and the legal structure defy any alternative. With pricing and taxing, the net sum for transactions is therefore rendered in fractions of a dollar. Indeed, even in the retail world of check cashing, rarely does the number reach a whole one, but invariably includes fractions of a dollar.

Thus, in virtually every commercial scenario, there is a residual, fractional portion of at least a dollar remaining from such transactions. In transactions where physical, fractional currency is due as "change" (coins or paper) to the consumer, or where cash is tendered to the merchant to initiate the purchase of goods or services, fractional metallic currency and fractional paper currency, together constituting "physical, fractional currency" is inevitably involved. Thereupon, the merchant must face the requirement of handling currency (and typically returning coinage), and the consumer must face the requirement of handling coinage and determining the best mechanism to utilize the same. Perhaps as a result of the bulk in carrying coinage about, or its perceived limited value (in comparison to paper money), or some other factor that renders the same a nuisance, carrying coinage is short term. The consumer generally seeks to disband the same.

One mechanism of disbanding of coinage is, e.g., a compulsory tip. In this manner, at the point of sale ("POS"), a consumer may simply say "keep the change" or present the change. While styled as a gracious gesture, the harsh reality is that the consumer would rather give away what appears to be trivial than face the nuisance associated with carrying the same. Of course, mathematically, calculating for that consumer the amount of money lost by avoiding the nuisance of change amounts to non-trivial amounts over time. Yet, this is but one option to avoid the necessity to handle metallic currency and determine where to place the same, or to carry the same.

Historically, the use of a "piggy bank" was predominately invoked as a curious form of non-institutional savings account (for which no interest is received). As the name connotes, the "piggy bank" was principally used by children as a means to teach conceptual savings and the individual valuations of the denominations of fractional metallic currency. Of course, such use for teaching is no longer necessary, as imitation "play"money is available, and children are trained to understand the fractional differences in currency quite rapidly. Thus, the juvenile teaching aspect of fractional metallic currency has truly become a relic of past memory, and not of present interest.

Moreover, as a result of the perceived substantial dissimilarity in value of individual coins (in comparison to large tranches of higher valued paper dollars), the perceived inconvenience of bulky currency has resulted in adults—not children—literally dumping their pockets at days end into containers (baskets, buckets, jars and the like), rarely to be seen or used by anyone again. All too often, jars are filled with coinage not because the consumer wishes a non-interest bearing savings account, but rather because the consumer wishes not to have the need to carry the bulk of coinage about. Industries have arisen that provide, for example, the ability—for a fee—to take such heavy and bulky containers filled with coinage to a location where the coinage is automatically sorted and paper currency (or chits) provided for conversion. Banks will accept coinage, but except for a rare few charge the customer for presenting the same. Even banks, as discussed in greater detail below, view coinage as a nuisance (while missing the point, pivotal to the subject invention, of the actual quantity of fractional metallic currency in circulation). Considering the heft of the containers and a cost for the transaction, one might determine that all those storage containers are not really worth the effort. Nonetheless, other than simply overtipping by the consumer in a transaction to avoid the receipt of fractional metallic currency (coinage) or simply giving the same away, of necessity the consumer will receive such heft, and routinely store it in some portion of the consumer's living space generally to be ignored for the future.

Antithetically, a number of devices still require the use of coinage for operation. For example, while "dropping a dime" in a telephone for a call has since changed in price, the concept of using coinage remains the same. Vending machines for the purchase of consumables or other items still require the use of coinage. Passive vending machines, like parking meters, tolls, admissions rights, municipal and private transit (trains, subways, buses, taxis and the like) all require some fraction of a dollar ("fractional currency") which generally amounts to coinage. (Some "smart" vending machines permit the use of debit or credit cards, but the technical interface is difficult to humanize, and market entry has been limited. Hard currency still remains the predominant form for the same.)

Despite the fact that consumers routinely engage such vending devices during the course of any given day, based upon the habitual desire to avoid the perceived nuisance of change (generally heft, ringing in the pockets, and other forms of consumer concern), rather than having change handy, the consumer who faces such devices must now scurry to a vendor not for a purchase, but to provide coinage—change on the dollar. This, of course, creates a never-ending burden on, for example, a street vendor proximate to an array of parking meters, to keep a stock pile of coins for swapping for dollars—of zero net sum gain—or, in the alternative, to almost rudely deny the desperate requestor who has parked and is racing to avoid the ticket.

No matter the scenario, rarely does a day end with cash transactions "zeroing" out. Rather, the end result is that the consumer who initiates the day with no coinage (having dumped the change from the prior day in the family bin to avoid inconvenience) now completes the day with more coinage, which, in turn hits the same family bin. The situation escalates, in typical fashion. Rarely does the consumer actually prepare for the event, but rather, disturbingly, must face coinage at the time of the occurrence. Interestingly, despite the fact that the result of a failure to pay for, by way of example, a parking meter, results in a multiple dollar fine—which is in whole dollars and is typically paid by a mailed in check—such sanction is avoided only upon the necessity of the moment. As a result of the inherent nuisance of change, many a consumer will avoid the necessity for change-related behavior, or face the urgency of the moment if it occurs.

As shown by the foregoing, it has become known that consumers receive more coinage then they actually place back into commerce. For a further example, at the "register" in stores for typical commercial transactions, it should be noted that generally coinage is trucked in and given to the consumer. Reportedly, many retail stores (supermarkets, for example) have daily (and at times more frequently) delivery of coinage in all denominations. Such stores must track the rate of depletion of the plurality of forms of fractional metallic currency in order to predict the needs and avoid the confusion of having too much of one form of coinage and not enough of another. While paper currency leaves such stores in armored trucks to be transferred to a banking institution, coinage is actually routinely delivered to such retail stores as the paper is extracted. The need to provide fractional currency in commercial transactions—which is heretofore solely in the form of metal or paper—is a constant, nagging, expensive, repetitive problem to many retail establishments.

Likewise, at the merchant end, a plethora of other problems arise in connection with physical, fractional currency transactions. At many registers today, a composite of credit card, debit card, and cash are employed on both sides of many of the transactions (cash back, etc.). Interestingly, the debit card does not involve the same fees to the merchant as a credit card, since the credit card transaction involves a percentage (1-10% depending on the credit card and the rating of the merchant) lost by the merchant as a transaction cost, but that does not change much of the scenario. The merchant loses money based upon a credit transaction fee, while the card companies and underlying banks receive the percentage of the sale as the transaction fee itself. Indeed, this scenario has resulted in the National Retail Foundation reporting in or about 2008 a total membership sales volume of $4.7 trillion upon a membership of 1.4 million. Retailers who are members employ 23 million employees. Indeed, there is a reported lawsuit concerning unfair credit card usage charges to such merchant/retailers in a drive to reduce this mechanized approach—with limited value added—because of the huge loss in revenue to the merchant as a result thereof.

In this vein, as discussed, prepaid gift cards have become a predominant tool. Not only does the consumer have the ability to gift a finite amount to another, but the merchant has received the money for the card and the card is viable predominantly at the merchant's location (but occasionally elsewhere as well). Currently, gift cards predominate as a means to capture the sale both ways—acquisition of the card by paying therefor, and use thereafter. Even here, however, gift cards have a remaining balance (small as it may be) not easily recoverable to the consumer.

Returning to coinage, which still remains a predominant issue, while governments can (and do) repatriate paper currency in large and successful manners for a host of necessary reasons, the same cannot be said of fractional metallic currency. Observably, consumers "hoard" coinage not because they are numismatists (coin collectors, of which there are many but the total amount of money involved is small) but because they simply wish to avoid the nuisance associated therewith. Simply put, paper is lighter and worth more. Yet, the Department of the Treasury reported that the total value of all fractional metallic currency in circulation in 2007 alone was approximately a staggering $33.3 billion dollars, growing at a rate of about $900 million annually. Thus, the accumulation of coinage in total numbers is remarkable. Indeed, the sum total value of all paper currency in the form of $1, $5, and $10 bills in circulation is less than the value of metallic currency. Considering the disparate value between paper and coinage, the sheer bulk of such coinage is overwhelming, and the value staggering, heretofore beyond the control of the banking institutions, and adding expenses in the requirement of bulk-handling to the merchants.

It is thus an object of the instant invention to provide a system, method and devices that enable the minimization to elimination of fractional metallic currency, and physical, fractional currency itself, from transactions without forfeiture of the underlying value. Likewise, it is a further object of the instant invention to provide a platform for commercial transactions that receives physical, fractional currency and deposits the same in the federal reserve system, but does not thereafter pay out such currency, thereby increasing the fractional reserve basis.

In order to understand the subtlety of the instant invention, it is necessary to understand money, banking, and the concept of "fractional-reserve banking."

Arguably, money was perhaps the most important historical advancement as a platform for human development and exchange of products and services. Money has been independently utilized at one time or another in each important civilization in the history of the world. There is also a remarkable similarity in the process by which money has evolved in different times in history and in different parts of the world.

Historically, money has typically evolved through three stages. In the first stage, money is comprised of a rare and inherently valuable material. The value of each denomination is related to the quantity of rare material contained therein. In the second stage, money is made of another material, such as paper, with no inherent value. In this stage, however, such other material can be exchanged into the rare material upon demand. In the third and final stage, money cannot be exchanged into anything physical, but its value is determined by law and custom, the "fair faith and credit" of the country of issuance.

Physical money has historically arisen as a means to facilitate trade. In most cases some form of metallic money has been used, but there are also other examples, where shells, or even large stones (on an isolated island) have been used as money. Oil was proposed as form of currency by the great Soros (and indeed is, at some level, used as a currency in and of itself). Gold and silver have predominated in the world as intrinsically valuable rare materials that can be easily rendered into denominations (contained pictures or other images of origin or pictorial images), but other metals have occasionally also been used. Bronze was the basis of the monetary system in early Roman times. Copper has also been used at times, for example in Spain and Sweden. In many cases, combinations have been used, with fixed exchange rates between different metals. Those fixed exchange rates have usually broken down as the relative value of the metals has moved due to changes in supply or demand.

Coins are the basis of almost every metallic monetary system. A coin in a physical money system is a piece of metal with a stamp. The stamp is a guarantee that the metallic weight and content is correct. Likewise, it is a mechanism to standardize coins of the same denomination as actually being of the same weight, caliber and value. While metallic coinage may appear trivial in the current climate, quality was historically important. Previously, metals had to be weighed in order to determine value, and that made trade more difficult.

In the United States, the third stage indicated above—where paper currency is no longer backed by the value of the underlying rare material—occurred, it is said, as a result of the abolition of the gold standard, often attributed to President Franklin Roosevelt in 1933. At this point was born the substitution of physical, fractional currency (coins and paper) by the Federal Reserve as the United States' "monetary standard" backed by the United States' full faith and credit. Some thirty years later, fractional metallic currency (coinage) followed suit, with the substitution of alloys for the traditional intrinsically valuable copper, silver and nickel originally used as the coinage material. Another crucial part of this process was the federal organization of the nation's banks through the creation of the Federal Reserve System in 1913.

Banking is an historical part of the economic system. During the Renaissance era, the Medicis in Italy and the Fuggers in Germany, were termed "bankers;" their banking, however, was not only private but also began at least as a legitimate, non-inflationary, and highly productive activity. Essentially, these can be termed "merchant-bankers," as they started as prominent merchants. In the course of their trade, the merchants began to extend credit to their customers, and in the case of these great banking families, the credit or "banking" part of their operations eventually overshadowed their mercantile activities. These firms lent money out of their own profits and savings, and earned interest from the loans. Hence, they were channels for the productive investment of their own savings.

To the extent that banks lend their own savings, or mobilize the savings of others, their activities are productive. Even in our current commercial banking system, if a customer purchases a $10,000 CD ("certificate of deposit") redeemable in six months, earning a certain fixed interest return, that customer is actually taking savings and lending it to the bank (in exchange for the CD which is a form of an "IOU"). The bank, in turn lends upon the money actually received in exchange for the CD at an interest rate higher than that being paid to the customer who purchased the CD. The difference between the higher rate to the debtor who received the loan, and the lower rate to the CD-holder who placed the cash, constitutes a portion of the bank's earnings. Indeed, in this manner, the bank has served the function of channeling savings into the hands of credit-worthy or productive borrowers.

The same is true of the great "investment banking" houses, which developed as industrial capitalism flowered in the nineteenth century. Investment bankers would take their own capital, or capital invested or loaned by others, to underwrite corporations gathering capital by selling securities to stockholders and creditors. The problem with the investment bankers is that one of their major fields of investment was the underwriting of government bonds, which plunged them hip-deep into politics, giving them a powerful incentive for pressuring and manipulating governments, so that taxes would be levied to pay off their and their clients' government bonds. Hence occurred the powerful and baleful political influence of investment bankers in the nineteenth and twentieth centuries: in particular, the Rothschilds in Western Europe, and Jay Cooke and the House of Morgan in the United States.

By the late nineteenth century, the Morgans took the lead in trying to pressure the U.S. government to cartelize industries they were interested in—first railroads and then manufacturing: to protect these industries from the winds of free competition, and to use the power of government to enable these industries to restrict production and raise prices.

Such investment bankers worked to cartelize commercial banks. To some extent, commercial bankers lend out their own capital and money acquired by CD's. But most commercial banking is "deposit banking" based upon a perception, which most depositors believe, that their money is "down at the bank," ready to be redeemed in cash at any time. For example, if person X has a checking account of $1,000 at a local bank, X knows that this is a "demand deposit," i.e., that the bank pledges to pay him $1,000 in cash, on demand, anytime he wishes to "get his money out." Naturally, the X's are convinced that their money is safely there, in the bank, for them to take out at any time. Hence, they think of their checking account as equivalent to a warehouse receipt. (If one puts a chair in a warehouse before going on a trip, one expects to get the chair back whenever one presents the receipt.) Unfortunately, while banks depend on the warehouse perception, the fact is far more complicated. Indeed, the money is not actually there at the warehouse.

A warehouse ensures, as required, that the goods entrusted to its care are there, in its storeroom or vault. Deposit banks as the Banks of Amsterdam and Hamburg in the seventeenth century acted as warehouses and backed all of their receipts fully by the assets deposited, e.g., gold and silver. This deposit or "giro" banking is called "100 percent reserve" banking. Ever since, banks have habitually created warehouse receipts (originally bank notes and now deposits) less than 100 percent, out of a carefully constructed fractional-reserve banking system, meaning that bank deposits are backed by only a small fraction of the cash they promise to have at hand and redeem. Currently, in the United States, this minimum fraction is fixed by the Federal Reserve System annually. Presently and historically this level has been at 10 percent.

To understand fractional-reserve banking, an example can be shown. "Y" invests $1,000 of cash in a bank 1. This amount is thus captive in the bank 1 subject to the terms of the investment. It pays out at a rate. This bank 1 then lends $10,000 to "W," either for consumer spending or to invest in his business. The question arises: how can a bank lend more than it has received? The answer resides in the "fraction" in the fractional-reserve system. The bank simply opens a checking account of $10,000 for W. Why does W borrow from the bank? Well, for one thing, the bank charges a lower rate of interest than Y would have (and has more to lend). Since demand deposits at the bank function as equivalent to cash, the nation's money supply has just increased by $10,000.

Now, W spends the money he borrowed. Sooner or later, the money he spends, whether for a vacation, or for expanding his business, will be spent on the goods or services of clients of another bank 2. Bank 2 receives a check from bank 1 and applies the same to demand cash (captive) so that it can utilize the same for fractional-reserve lending. Obviously, if bank 1 defaults, this system could collapse.

Hence, without government support and enforcement, there would be only a limited scope for fractional-reserve banking. Banks could form cartels to prop each other up, but generally cartels on the market fail without government enforcement, without the government cracking down on competitors who insist on busting the cartel, in this case, forcing a run on competing banks, by having their customers demand a full pay out from their accounts.

Hence historically there was a drive by bankers to compel the government to control their industry. Central Banking began with the Bank of England in the 1690's, spread to the rest of the Western world in the eighteenth and nineteenth centuries, and finally was legislated in the United States via the Federal Reserve System of 1913, creating the Federal Reserve (the "Fed").

In modern central banking, a "Central Bank" is the sole legal issuer of bank notes (originally written or printed warehouse receipts as opposed to the intangible receipts of bank deposits). This has evolved into issuance of national currency itself. If, therefore, X seeks to redeem $1,000 in cash from his checking bank, the bank draws down its own checking account with the Fed, effectively "buying" $1,000 of Federal Reserve Notes (the cash in the United States today) from the Fed. The Fed, in other words, acts as a bankers' bank. Banks keep checking deposits at the Fed and these deposits constitute their reserves, on which they can and do perform fractional-reserve banking at the average leverage of 10 to 1.

For further example, if the Fed determines that it is advisable to expand (i.e., inflate) the money supply, the Fed goes into the market (called the "open market") and purchases an asset, including, e.g., corporate stocks, buildings, or foreign currency, but historically most predominantly, U.S. government securities.

For example, the Fed buys $10,000,000 of U.S. Treasury notes from Investment Banker, by check in exchange for $10,000,000 in U.S. securities. Investment Banker can do only one thing with the check: deposit it in its checking account at a commercial bank. The "money supply" of the country has already increased by $10,000,000; no one else's checking account has decreased at all. There has been a net increase of $10,000,000.

The commercial bank, in turn, deposits that check in its own account at the Fed, which now increases the reserve by $10,000,000, and lending ability to about $100,000,000 on the 10:1 ration. Stated another way, banks are obliged to keep 10% of what they have lent in a captive reserve base of demand deposit accounts. It should be observed that banks are regulated (like Regulations D and E) in the manner in which protections are provided, and collapse prevented.

Observably, this system makes banks highly competitive, seeking to increase their "captive" reserve in order to increase their fractional-reserve and ability to lend in the exponential process indicated above. In order to permit expansion of the reserve at banks, banks are constantly seeking depositors, those who wish to have their money captive by a bank (as in, e.g., a CD) which permits the reserve to increase and the leverage (of about 10:1) to be employed upon this money.

The meeting between the approximately $33 billion of fractional metallic currency—which is not materially included in any reserve—and the fractional-reserve banking system lies as part of the heart of the instant invention which provides a system, method and devices to collect and deposit fractional metallic currency (and indeed all physical, fractional currency) in demand deposit accounts—a sort of "one way street" to the federal reserve basis—while enabling the depositor to use the financial equivalent of that collected and deposited without forfeiture of value, free from the hassle of storing or carrying currency and free from bank supervision in every manner, for a myriad of commercial transactions, without costs and fees typically associated with credit and debit card transactions and with a complete, with a verified and personal "on-demand" balance and transaction history and no money "left behind."

By way of background, the stored value card market, while huge in volume, also leaves fractional currency behind on the cards issued. Wal-Mart®, with sales of some $348.50 billion, employees of some 1.9 million people, and over 4000 U.S. locations, recently withdrew its application for a banking license, leaving it amongst banks, a multiplicity of credit cards (with billions of dollars in fees), check cashing facilities (where cash is the final product, thereby reducing the amount of money Wal-Mart has available), and an inability to control its own credit card which is, instead, through G.E. Money Bank, passed through the Discover wire network, with the concomitant fees. (Wal-Mart is also offering a vast array of other services to its customers which likely do not involve G.E. and tend to suggest Wal-Mart's incursion into the virtual banking environment. Yet, with that having been stated, even the concept of, let alone the specific formulae for, the instant invention and its inherent benefit to an entity like Wal-Mart which has indicated its preference to act as a virtual bank whenever possible, is an object of the instant invention.)

It is thus an object of the instant invention to provide a system whereby physical, fractional currency received from customers who purchase a device employed by the system of the current invention, is added to the merchant's captive demand deposit account with a federal reserve bank, and the merchant can then entertain commercial transactions within its venue. It should be appreciated that Wal-Mart has succeeded in its theme of a "one stop shop" where everything can be purchased (even grocery food), proving the attraction to consumers in not needing to shop anywhere else for virtually all goods sought and needed, from consumables through vehicles. It is thus an object of the instant invention to provide a system whereby a series of devices are purchased for, and reloadable with quantities of physical, fractional currency, the value is added to a virtual account maintained by the merchant, and the currency deposited with the merchant's federal reserve bank, such that the device is employable within the merchant's venue for a vast array of commercial transactions of the customers' choosing, including all purchases at its point-of-sale ("POS") terminals, in lieu of existing gift cards, stored value cards, debit cards and credit cards. In this manner, the large-scale merchant can increase its attraction and sales to all consumers, offer specific enhanced advantage to the "unbanked" and "underbanked," track consumer habits, collect fractional metallic currency (and all currency from circulation) and add the value of the same to its bank's demand deposit reserve as well as adding the value of the same to its total gross sales of goods and services, lower its fees and lower its costs, enabling better, less expensive, goods and services to be made more readily available to the consumer base, while directly enhancing the U.S. economy and lending ability.

Other objects of the instant invention will be shown hereinbelow.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through a system as shown, described and claimed, that provides a virtual banking environment in a merchant venue while increasing the deposit-based assets of a related traditional banking institution having a captive account therein for fractional-reserve banking. In particular, the invention enables the performance through execution (completion) of a wealth of commercial transactions from ordinary purchases and sales of goods and services through virtual banking, all at and within the merchant's venue. In particular, the merchant provides a customer-specific portable device which interfaces with one or more nodes that the merchant provides at POS and other locations within the merchant's venue, to perform commercial transactions, upon the customer's demand and the merchant's acceptance (which is automatic if the account balance reflected by "account balance-type data" (as explained below) is sufficiently above zero). There is no narrowing of commercial transactions that can be performed, as they are identical to those typically offered and executed in the ordinary course of the merchant's business, heretofore by cash, check, or card.

Conveniently, uniquely and optimally for the customer, data reflecting each of those commercial transactions, including balances, is stored and rendered visible and reviewable, upon the portable device, upon that customer's demand, anywhere and at any time. No longer will a customer wonder what may be remaining or what has been spent.

Money in all of its heretofore known forms, whether it be cash (i.e., physical, fractional currency), check, credit card or debit card, is received and its value added to the system as a credit-type transaction, for use in further commercial transactions by the customer whose identity validates the portable device for which the money was received. In accordance with the preferred embodiment of the instant invention, guess work is removed at virtually all transactional and banking levels. Money received is deposited in, and credited to, the merchant's demand deposit account in a federal reserve banking institution, and simultaneously credited to a virtual account means that the merchant retains for tracking each individual portable device and that customer's transactions, histories and balances.

In this manner, the money received becomes "captive" for federal reserve banking purposes, and, likewise, is useable for merchant-consumer commercial "debit-type" transactions, as it is not intended that employment of the system, in its preferred form, "returns" physical, fractional currency in any manner. It should be appreciated, however, that the system may be employed in a less-than-perfect manner as in, for example, performing commercial transactions that result in legal tender to the customer, as such employment, while not optimal, is nonetheless within the letter and spirit of the invention and the claims appended hereto.

Thus, the device is acquired by a customer and/or initially loaded by normal payment techniques, that comprise, on the lower end of desirability (against enhancing currency "capture") through payment by check, credit card, debit card, or other mechanism, preferably by the use of a quantity of physical, fractional currency (dollars and coins), and more preferably metallic currency (thereby redeeming such currency from its current state of "in circulation" and adding it to the demand deposit asset base for fractional reserve banking).

For example, where check cashing is provided in a "one stop shop" environment (typified by, e.g., Wal-Mart), the check is "cashed" in a "credit-type transaction" in the inventive, preferred system as one of the plurality of commercial transactions enabled, between a portable device and a node device. The positive amount of the check is wired as a deposit to the merchant's bank (thereby increasing the demand deposit base and account balance), a virtual deposit for that amount is made in the merchant's virtual account means in correlation with the specific portable device, and the portable device register is updated to reflect that system data, for display to the customer on demand. In a "one stop shop" environment, such a scenario is most advisable, as the consumer can cash a check, have a portable device with that amount as its balance, and acquire virtually all goods and services needed or wanted. In the suboptimal embodiment, that customer may retrieve a small portion of cash, if needed, for other uses. (Evidently, incentives can be provided by the merchant to minimize if not eliminate any "cash-back.")

It should be appreciated that while observing the customer's specific transaction history, it can be predicted the frequency of such check cashing and the use of proceeds, as such data remains captive in the system with the merchant (and upon the portable device with the customer). Likewise, a predetermined amount (like a gift card or reloadable stored value card) once placed upon the consumer portable device (now an SVD) is, in the preferred embodiment, completely captive as its use remains solely within the constrains of the merchant's venue, for goods and/or services that the merchant provides.

Even other features, if enabled—like payments (of bills, rents or debts) to other than the merchant—commence and maintain a routine that becomes predictable, such that associating the device with its own account at the same bank as that which maintains the merchant's account, permits predictability of the captive balance (and certainly a net increase of the demand deposit base between the accounts), heretofore inachievable.

It should be appreciated that in all such modalities, the increased, captive amount remaining in the federal reserve system, resulting from implementation of the inventive system, is directly useable for fractional-reserve banking. Likewise, by avoiding the entire pre-existing credit card and debit card processing systems explained hereinabove, the extra percentage expense per transaction is directly avoided. To the bank, rather than receiving a percentage of a sale via a credit card or debit card system (which has heretofore increased the friction between merchant and bank), in these instances the bank receives a 10:1 leverage upon the increased captive base for use in fractional-reserve banking, which far exceeds the per transaction fees it would otherwise collect. In other words, it can easily be observed that the key feature of the instant invention thereby achieved, is that the associated bank's revenue, based upon fractional-reserve banking resulting therefrom, is greater in utility and actual return than the frictional card processing fees heretofore received and herein eliminated.

Likewise, the consumer is benefitted, another feature of the instant invention, in that the consumer—whether the "banked" or "unbanked"—has the ability to acquire nearly all necessary food and household goods from the "one stop shop" on a predicable, budgetary basis, leaving but a small need, if any, to withdraw cash. For if the consumer can purchase all necessary goods and supplies, pay all necessary bills, and accomplish all transactions typically occurring in a multitude of more complicated manners, the consumer actually enjoys the "one stop shop" convenience in all forms and results in having no need for cash.

It should be immediately perceivable how "viral marketing" will assist in the dispensing of portable devices to others in commercial connection with those who have received and seek to employ, or have employed, such devices for the payment of bills, rents and other debts. For example, in satisfaction of a customer's need to issue a check or pay cash to a (non-institutional) creditor for a debt, the merchant can issue a portable device (with, or without, its own associated federal reserve bank account, but in both events with its own associated merchant-hosted virtual account) to that creditor, with the amount of part or all of the payment (perhaps plus incentives) credited thereupon. In this manner, the associated federal bank (which maintains demand deposit accounts associated with portable devices) receives another captive account, the merchant another customer, and rather than the payment "leaving" the circle, it is maintained.

The consumer is also benefitted by the full gamut of services that are provided by the merchant as if it were a virtual banking environment, with a record of such activities, in that the consumer device (as well as the node) are immediately readable in that display means are provided linked to the account information such that the consumer can know at any given time the precise amount of money remaining on the device and the transactional history that caused such a result, thereby overcoming the heretofore known need in the industry to provide statements (or their equivalents) to a banked consumer, and the absence of any record given to the unbanked (user of an SVC/gift card, in this instance using an SVD).

It should be appreciated by one of ordinary skill in the art that by providing on demand consumer account information to the consumer on a portable device, the consumer's use of such a device is a tremendous advantage over the heretofore used card-swipe systems, which will incentivize further use. In the card system, there is no mechanism for the consumer to view balance and transactional information as the card is but an account information provider encrypted in a magnetic swipe portion. Thus the Federal Reserve's (and/or FICO's) indicated need to have and provide bank account information as a predicate to permitting scoring for creditworthiness—which maintains the "unbanked" or "underbanked" in that undeserving status—is herein provided to both the consumer and the merchant, as well as optionally to a banking institution. In this manner, the merchant and/or banking institution can now exercise the ability to provide credit to this consumer class as the historical transactional information is stored and rendered available to both sides of the transaction.

In this manner, one of ordinary skill in the art can well see that virtually inevitably, cash in all of its forms becomes an item of the past, all are benefitted, the costs are lessened, and while the traditional credit card networks may suffer, the merchants with, or without the banks, also enjoy the benefits of fractional-reserve banking: the 10:1 leverage. This is a far greater reward for all involved.

Likewise, the system enables the capture of fractional metallic currency values by a financial institution that can thereupon utilize the same as part of its fractional-reserve. In particular, under the preferred embodiment, there are two types of devices that are employed for each commercial transaction: a portable device and a node device. Under the preferred embodiment of this invention, only the merchant has an account with a financial institution. The portable device is linked to merchant-captive, computer-hosted, virtual account means, which maintains all transactional information. Thus, the balance of the merchant's bank account only rises as a consequence of use of the inventive system, and the subsequent commercial transactions intra-merchant, are never recorded nor the system data forwarded to the bank.

In particular, a portable device means is employed herein. The portable device has a number of features, including security (like a biometric reading means or other), a display, a microprocessor, memory, and the like. In this manner, the portable device is actually an interface to the account at the merchant, which optionally ties to a portable-device-specific account at the banking institution, and preferably does not. (It should be appreciated by one of ordinary skill that the specific phrases "bank," "institution," "financial institution" and the like are utilized herein virtually synonymously for all such banking institutions that provide accounts and can take advantage of Regulation D and/or fractional-reserve banking.)

The portable device is also the equivalent of the piggy bank in the sense that it is a recordation and display device for all money, including quantities of physical, fractional currency, including paper and coins, in all inventive embodiments. The piggy bank, instead of an animate object holding actually coinage, is an account with a merchant and/or financial institution, devoted solely and captive therewith, in which the user has deposited currency for use of the device. In this regard, overcome is the necessity to have containers for change, as the use of the portable device is developed, as explained herein, there will be a steady decline in the need to use coinage (and even paper currency), with only positive rise in merchant-customer commercial transactions. The approximately $33 billion in coinage that is in "circulation" and hence not considered part of the federal reserve, can now be effectively captured and used for all commercial purposes.

It should be appreciated that in this embodiment, the consumer can acquire a portable device employed by the inventive system as an "SVD" ('stored value device") in a manner that meets and exceeds the advantages currently afforded by an "SVC" ("stored value card"). The device can be "purchased" from a merchant with a predetermined, prepaid amount, either reloadable or not, as a bearer-type or customer-specific, utilizable solely at the merchant's facility such that the transaction does not result in any reduction in the fractional-reserve of the banking institution. Like an SVC, upon purchase, money (preferably coinage) is given to the merchant. In the preferred embodiment, the SVD is utilizable solely at the merchant's facility, and hence funds are added and thereafter remain captive to the merchant's bank account. If reloadable, a "gift" can merely be an additional to the balance of a customer's portable device. In this manner, the fractional-reserve of the bank is optionally increased—but never decreased. Even though the balance is decreased as shown by the portable device (and the merchant's virtual account means) for each subsequent commercial transaction, the result to the merchant and to the merchant's bank never decreases.

It should be further appreciated, that multiple merchants may join together to further advantage their customer bases, simply by affording use of the system, and reciprocal use of portable devices in all such joined multiple merchant venues, provided each such merchant maintains a demand deposit account in the same banking institution for receipt of the deposits from sale, loading and reloading of each device. In this manner, the fractional reserve basis of that bank is not reduced by subsequent commercial transactions, as the basis reflects the sum of all demand deposit accounts therein, despite the necessity of each of the merchants accounts changing as one is credited and another debited for subsequent commercial transactions, depending upon the specific merchant venue in which they occur. Again, many incentives can be provided, and inter-merchant opportunities arise from such co-licensing ventures in a manner that do not implicate anti-trust legislation or regulation.

Likewise, a check from a consumer or employee can be cashed and the amount kept captive, at least in large part on the portable device. In this manner, for example, the employee of a large "one stop shop store" can also receive pay via the portable device, and be capable of using the same to acquire virtually all needed purchases from that merchant in the manner explained hereinabove. Thus, the merchant's payroll payments to its employees, instead of fully disappearing from the demand deposit account balance, can now be maintained, in part or all. Currently, once a pay check is "cashed" the merchant/employer's balance is reduced, and the proceeds lost. In accordance with the subject invention, however, money never leaves the bank, as it is passed to the (also captive) portable device, and used therefrom for purchases from the merchant. The fractional-reserve amount of the bank, heretofore reduced by payroll, is now increased to the point of complete, in its captivity.

In certain instances, such employee may deposit a portion (if not all) on the captive device, and wish to extract cash. Yet, based upon the purchasing patterns of such people, it is adduced that but a small fraction will ever leave the merchant, and hence will forever remain captive to the merchant. This amount is predicable, based upon the behavior of the employees, as the use by each is tracked from payroll through the use of the portable device.

It should also be appreciated that a non-employee can "cash" checks, in the foregoing manner, as well. The check cashing industry is in the billions of dollars. To give to the recipient a portable device with most, if not all, of the paycheck thereupon not only induces intra-merchant purchases (and hence a predicable captive amount) but the ability for the employee to avoid taking cash and spending on ill-conceived items, for purchases at the merchant, where it is "one stop shop" are generally of items of use, rather than items of entertainment or the like. This, like the piggy bank analogy, assists in increasing the saving-nature of the check casher who is now, when employing the inventive system, more inclined to avoid impulse cash expenses in favor of actual necessary purchases.

It should be further appreciated that the merchant, while not a banking institution, becomes a virtual one for intra-merchant transactions, and optionally "buddies" with a specific banking institution to create a reliable multi-million dollar addition to that institution's fractional reserve. Not only does the SVC-type portion of the system retain captivity, but the inducement to check "cashing" also increases captivity. Hence the advantage to all concerned is clearly established as a significant feature of the instant invention.

The portable device has an encrypted communication interface with a node device. The node device, in distinction from the portable device, is typically linked to a point of sale device "POS" (whether an actual POS device or its equivalents, like a passive or active vending machine). The portable device is independently battery powered and is carried, like a fob, with and by a customer. On the other hand, the node device is generally considered to be stationary, with a vendor.

Importantly, the node device communicates on the one hand with the portable device, and on the other through the merchant's network to the merchant's virtual account means. In the preferred embodiment, only "cre-bit"-type system data for "credit-type transactions" is communicated by way of the federal wire to the federal reserve bank that hosts the merchant's demand deposit account. Such "cre-bit"-type system data comprises a value (to the bank, always positive) and an amount (reflecting the money received for either acquisition, load or reload of the portable device). In this manner, it can be observed that the transaction(s) between the portable device and the node device remain within the constraints of but one banking institution, in this preferred embodiment. In this manner, while currency passes electronically for services or goods between the portable device and node device (customer and vendor, e.g.), the actual underlying money never leaves the banking institution, and indeed, the specifics of those transactions are never sent to, nor recorded by the banking institution (thereby governing privacy, amongst other things).

Observably, as more transactions occur, the merchant with (or without) the banking institution maintains, as captive, the total amount of money exchanged between the parties—it merely moves about the merchant's virtual account means. In this manner, the reserve for which fractional leverage can be had by a bank is increased. Likewise, in light of maintenance of the records of transactions available to consumer and merchant alike, with data-mining facility, the lending/borrowing power and FICO-scoring ability for each consumer linked to an active device is thereby increased as well. Since the preferred embodiment is intended to also capture the fractional metallic currency market, conceptually, the bank has now garnering portions of the aforementioned approximately $33 billion in coinage in circulation adding the same to its reserve—a situation heretofore unknown and practically impossible to achieve. Thus, whereas coinage has been a nuisance and typically invokes a charge for conversion, in this manner, coinage has now become a captive asset of the bank, and transactions involving the same are also beneficially not subtracted from the reserve of that bank.

Likewise, benefits ensure to customers as well. Rather than have the nuisance and inconvenience of cash, checks or metallic currency, customers can utilize a "fob" styled (a "fob" is a small device attached to a short strap, ribbon or chain) simple portable device for all fractional exchanges, from purchases from active vendors, to passive vendors, POS devices and others. No longer must the customer keep cash, checks or coinage. Instead, money is converted, and added (at the bank if no consumer transaction is invoked) on an as needed basis. As a result of the design, the customer can view on the portable device the balance and transactional history, and the merchant with (or without) the bank has the full record of each transaction as well reported by the portable device when engaged and via communications per transaction by the node device(s).

Observably, it is within the letter, sprit and intent of this invention to permit the elimination of all forms of currency and virtually all forms of consumer banking. Even so, capturing a heretofore ubiquitous $33 billion coinage that has heretofore been but a nuisance, and transform the same to an asset captured by the reserve of a bank is an observably beneficial feature.

Further, it is a feature of the invention to permit inter-bank transactions, as may be desired in the future. As this may be cumbersome, the instant invention demonstrates utility specific to a single bank (but all of its branches and affiliates) to increase the reserve of that bank. Clearly, inter-bank exchanges can be affected as the case my be, without deviating from the spirit and scope of the claimed invention.

Preferred components for the portable and node device means are shown in FIGS. 3, 4, and 6-10, In particular, the portable device is activated by an optional security interface which may take the form of a number of different variations. Such security is important to the extent that the portable device may not be "hacked" or otherwise misappropriated and the amount of money in the account to which it is linked stolen. In this respect, it is a goal to employ a biometric interface (like a thumb scanner) to read the thumb print of the owner, compare it to that of the owner (pre-stored) and thereupon permit use of the device. Other security features are also considered. The user can lock down the device by engaging a code through the interface, and unlock the same by engaging the same code. Other security interface mechanisms can be employed without deviating from the letter, scope and claims of the subject invention. Importantly, the security feature must balance user compliance issues with power constraints in order to achieve maximum efficacy.

The goal of the portable device is to engage a battery source (that is preferably rechargeable optionally by a solar panel) for daily operations without a "down" time. Thus, all hardware components and their relative draw-down on the battery are considered for optimal performance.

The portable device also contains an operator interface for entry of instructions (as in a push button and a wheel, a display for indicating the progress of security, the transaction, and balance and transaction reporting, memory for storing instructions and permitting changes based upon transactions, a processor with digital input/output ("I/O") support to process the pre-encoded algorithms and to regulate the operation of the hardware, power management for controlling the power supply, a wireless communication interface (which includes a properly determined antenna) for proximate engagement with a plurality of node devices, and an optional wired communication interface for a hardwired connection, if so desired.

In the preferred embodiment, wireless communication utilized the "Bluetooth®" standard encryption. Observably, any electromagnetic spectra frequency can be employed, as well as ultrasonic devices, as well as any standardized encryption algorithm provided both sides that can "speak" effectively. It should be appreciated by one of ordinary skill in the art that while the present, preferred embodiment uses Bluetooth®, any such communication system that provides substantially the same results can be employed without deviating from the scope, spirit and claims of the subject invention.

BlueTooth® is a specification for the use of low-power radio communications to wirelessly link phones, computers and other network devices over short distances. The name "Bluetooth" is borrowed from Harald Bluetooth, a king in Denmark more than 1,000 years ago. Bluetooth® technology was designed primarily to support simple wireless networking of personal consumer devices and peripherals, including cell phones, PDAs, and wireless headsets. In this manner it is currently an ideal communication method herein, but the invention is not limited thereto. Wireless signals transmitted with Bluetooth® cover short distances, typically up to 30 feet (10 meters). Bluetooth® devices generally communicate at less than 1 Mbps.

Bluetooth® networks feature a dynamic topology called a piconet or PAN. Piconets contain a minimum of two and a maximum of eight Bluetooth® peer devices. Devices communicate using protocols that are part of the Bluetooth® Specification. The Bluetooth® standard utilizes the same 2.4 Ghz range as 802.11b and 802.11g, typically used in WiFi systems.

Also as shown in the foregoing enumerated figures, the node device has components similar to those of the portable device, save for one preferred change. Since the node device is generally not portable, it has sustaining power supply via wall power, and its communications to the merchant and/or banking institution can be through normal telephone communications (whether twisted pair, voice over IP, Internet direct, cable, or the like).

In operation of the method and system, agreements are executed between customers and merchant vendors. Each are given, respectively, portable and node devices, and the communication system established. Each portable device is initiated by placing thereupon currency, preferably (but not for limitation) fractional metallic currency equivalents. In this respect, a bank can capture the actual metallic currency through the merchant, and the merchant can "credit" the portable device therewith. The portable device, which is both a "credit" and "debit" device (herein considered a "cre-bit" device) then lists debits when transactions occur at designated nodes.

Nodes are widely dispersed, much like their predecessors of magnetic swiping machines. Thus, it is perceived that nodes will be in retail establishments, attached to POS devices, in vending machines both passive and active, and the like.

In this manner, it is a general feature of the instant invention to provide a system, method and devices for capturing the physical fractional currency market and adding the amounts captured to the fractional-reserve of at least one bank, while simultaneously eliminating the nuisances associated with transactions and bulk of fractional metallic currencies.

Preferably, the microprocessor of the portable device is an ARM Processor, the display means is an LCD display approximately one inch by one inch, the operator interface comprises a mouse-type button, LED and wheel, power is provided by a battery, memory comprises memory selected from the group consisting of SRAM, Flash, ROM and combinations thereof, and the communication is via a Bluetooth® chip.

Lastly, it should be appreciated that the present currency rounds to the nearest hundredth of a dollar. This is a result of the penny, which represents the smallest amount of U.S. currency. Yet, mathematically, numbers are rounded. The instant system, method and apparatus completely overcomes this limitation. Rather than rounding, there is an electronically inherent opportunity to capture the $>10^{-3}$ quantities of money which themselves can reface reserves, thus creating a true and honest exchange of goods, services and currency to the benefit of the National good.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

Figure 1:
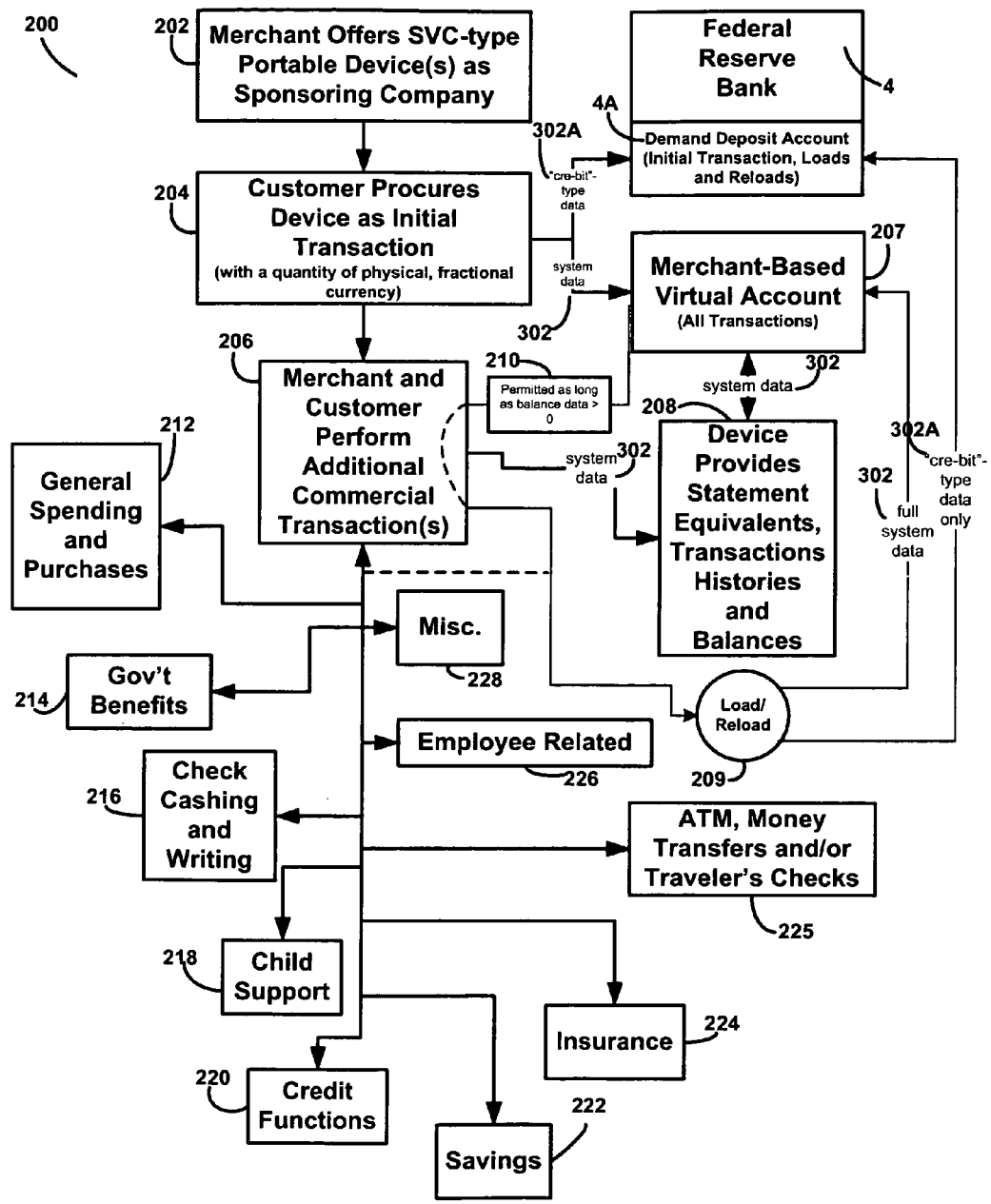
FIG. 1 is an overall diagrammatical view of the system and components of the subject invention, in accordance with an embodiment thereof.
Figure 2:
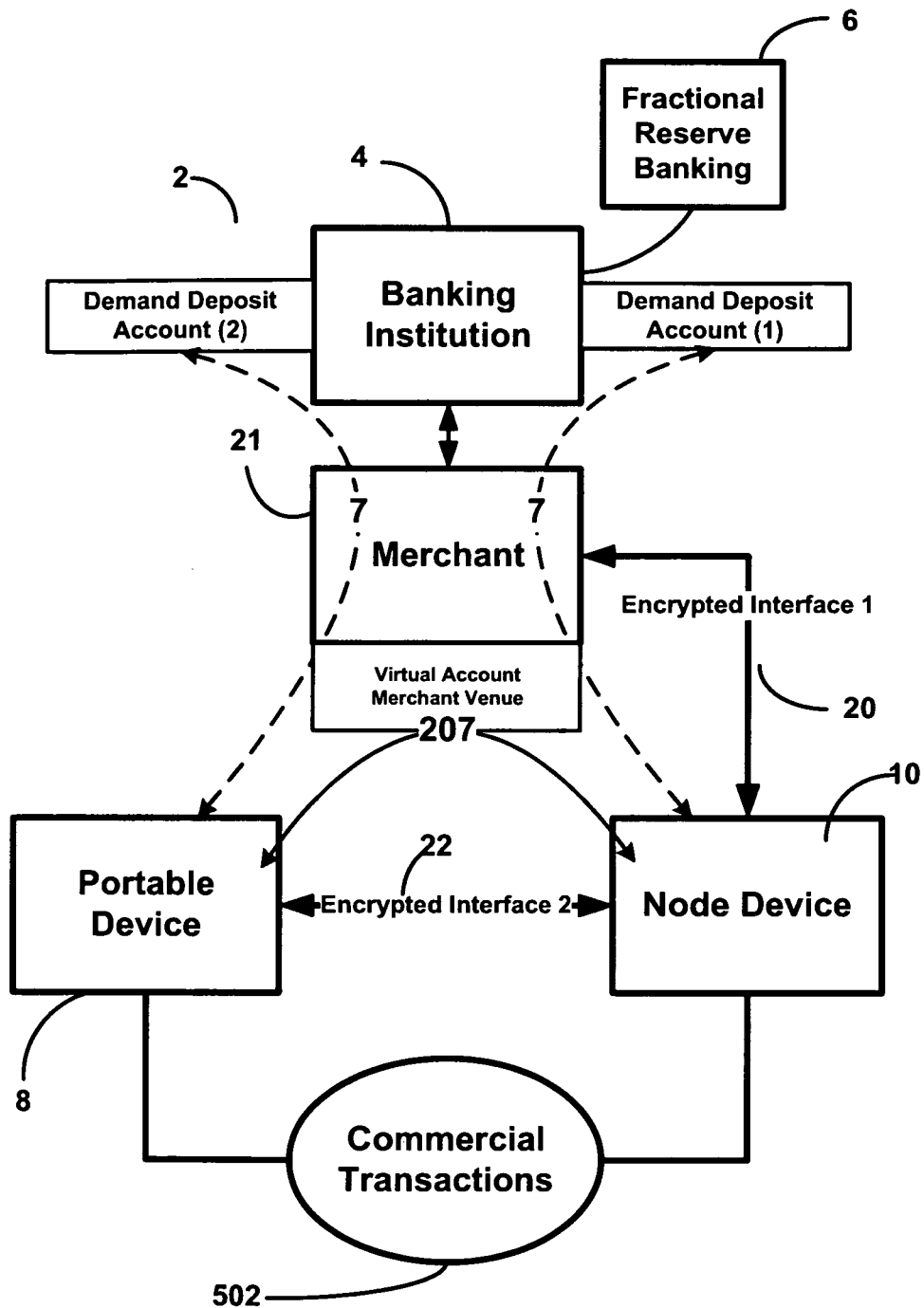
FIG. 2 is an overall diagrammatical view of the system and components of the subject invention showing at least two of its distinctive embodiments.
Figure 5:
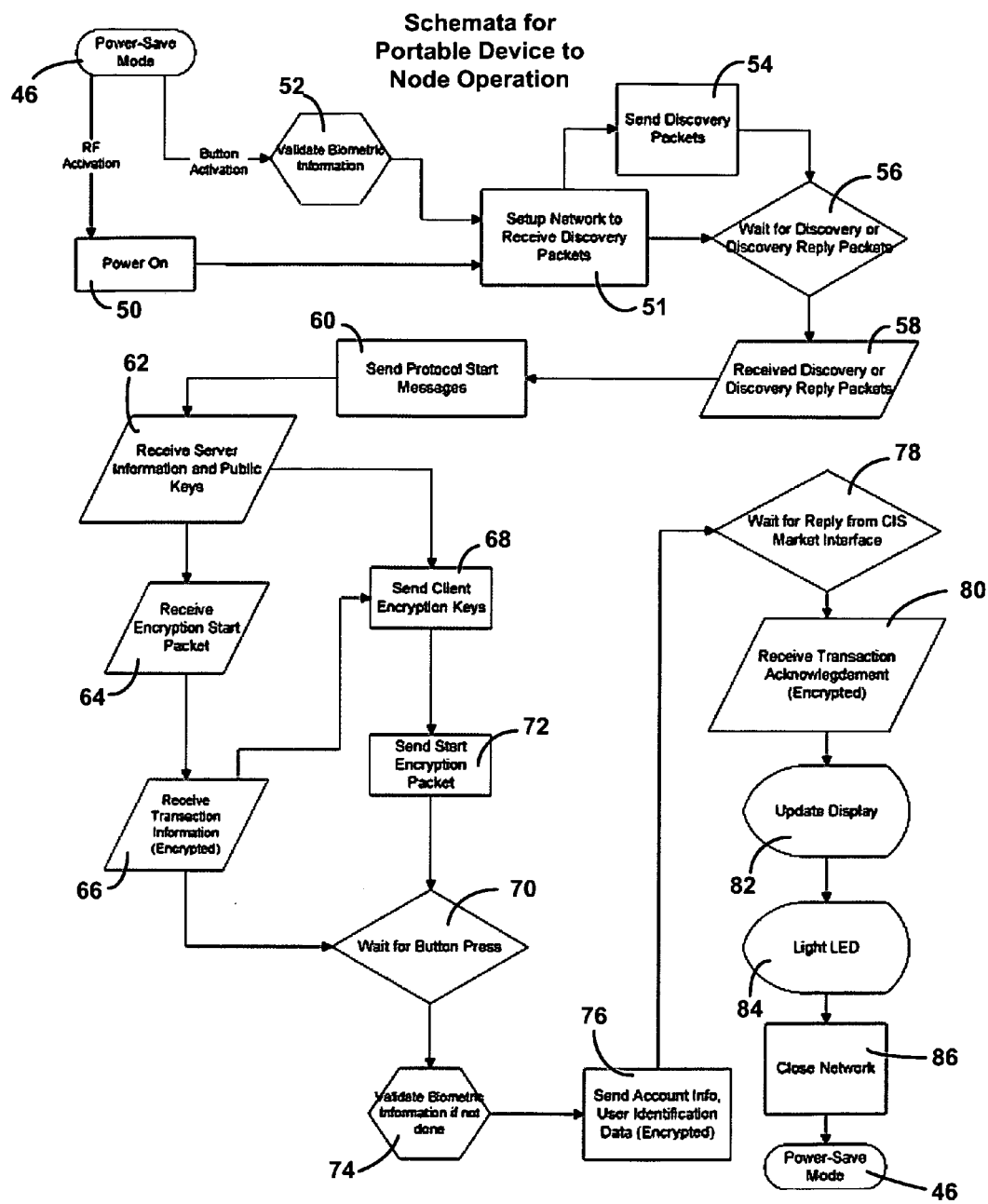
FIG. 5 is a flow chart schematical representation of the portable device operation with the node device, in accordance with an embodiment of the subject invention.
Figure 5A:
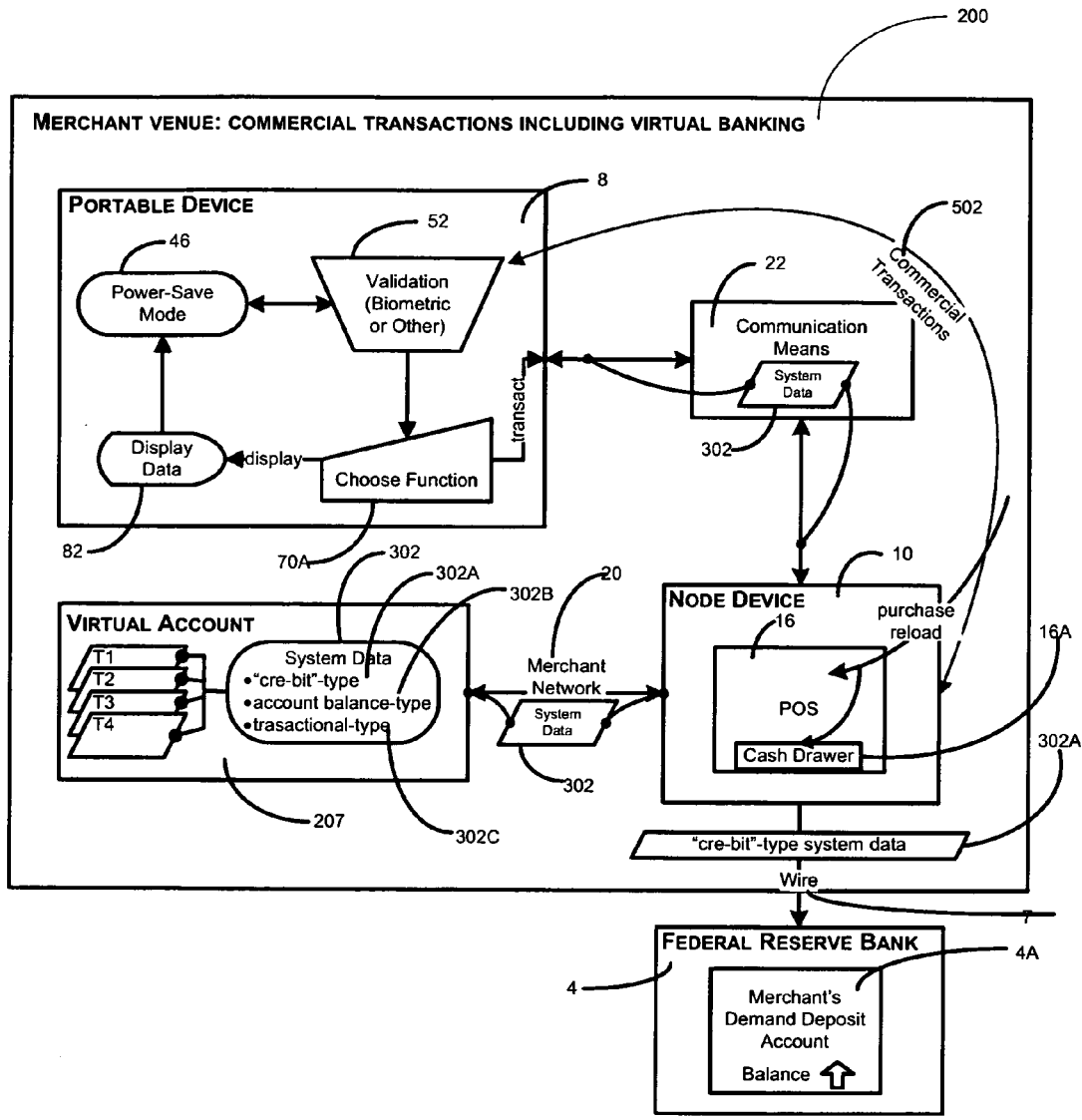
FIG. 5A is an interactive component view of the merchant venue, comprising a portable device, communication means, node device and virtual account means for performing commercial transactions, interfaced with a federal reserve bank at which the merchant maintains a demand deposit account which increases as shown, in accordance with the preferred embodiment of the subject invention.
Figure 6:
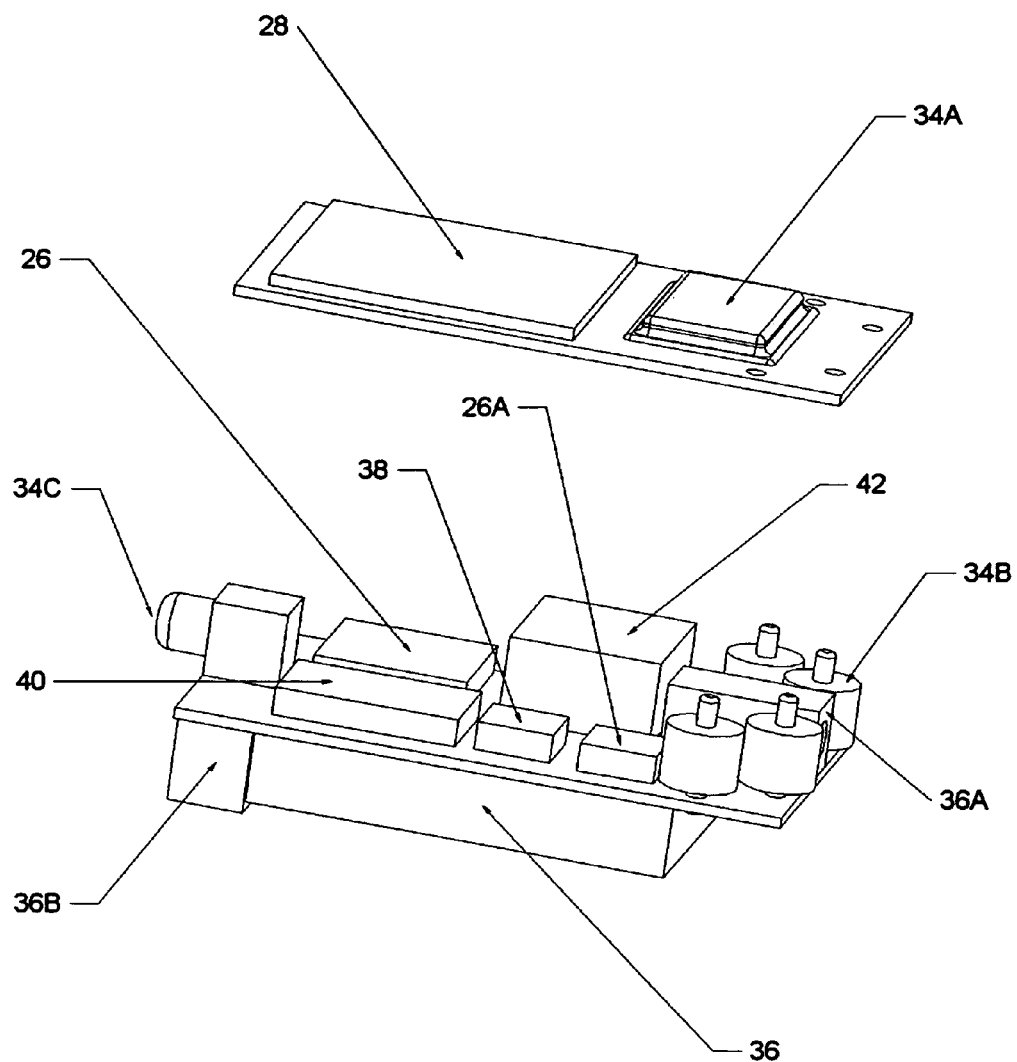
FIG. 6 is an exploded side view of the portable device showing specific components and layout in accordance with the preferred embodiment of the subject invention.
Figure 7:
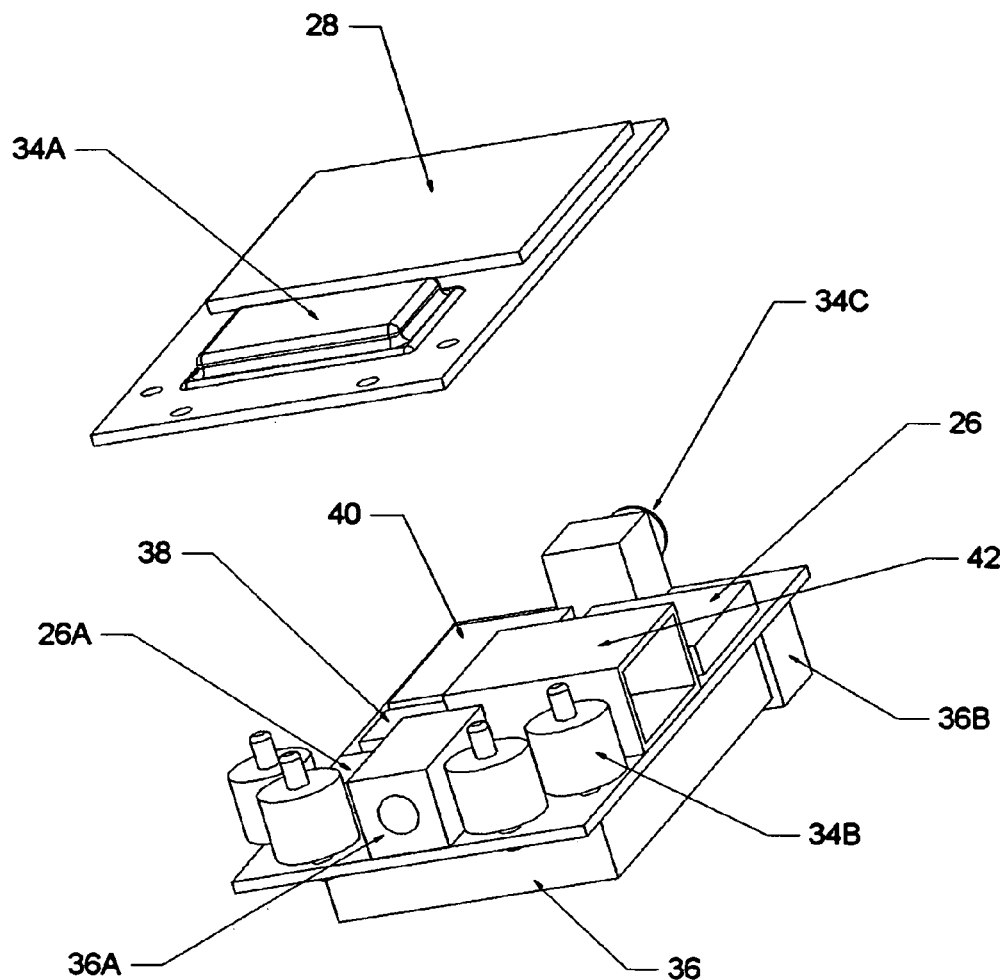
FIG. 7 is an exploded back view of the portable device showing specific components and layout in accordance with the preferred embodiment of the subject invention.
Figure 8:
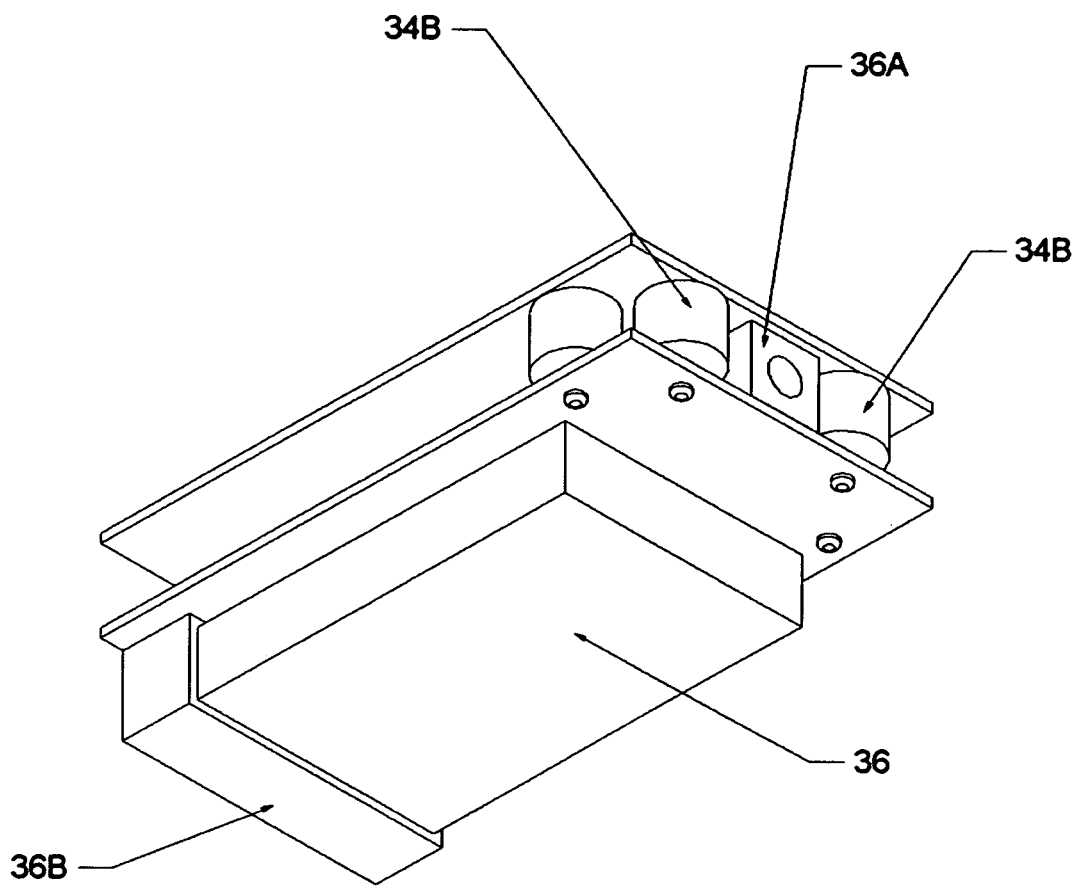
FIG. 8 is a perspective bottom view of the portable device in closed manner, in accordance with the preferred embodiment of the subject invention.
Figure 9:
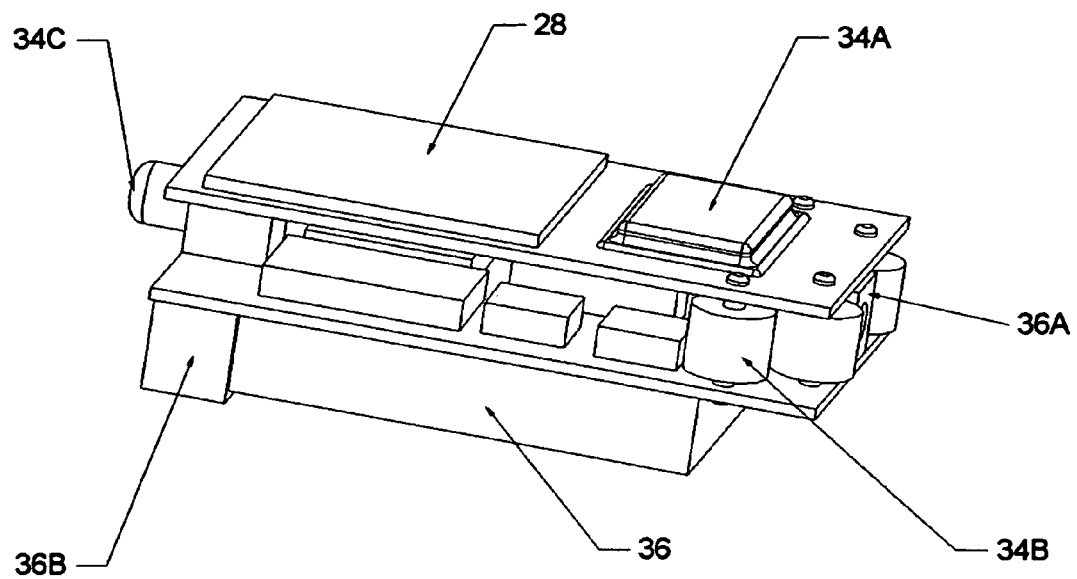
FIG. 9 is a perspective side view of the portable device view in closed manner, in accordance with the preferred embodiment of the subject invention.
Figure 10:
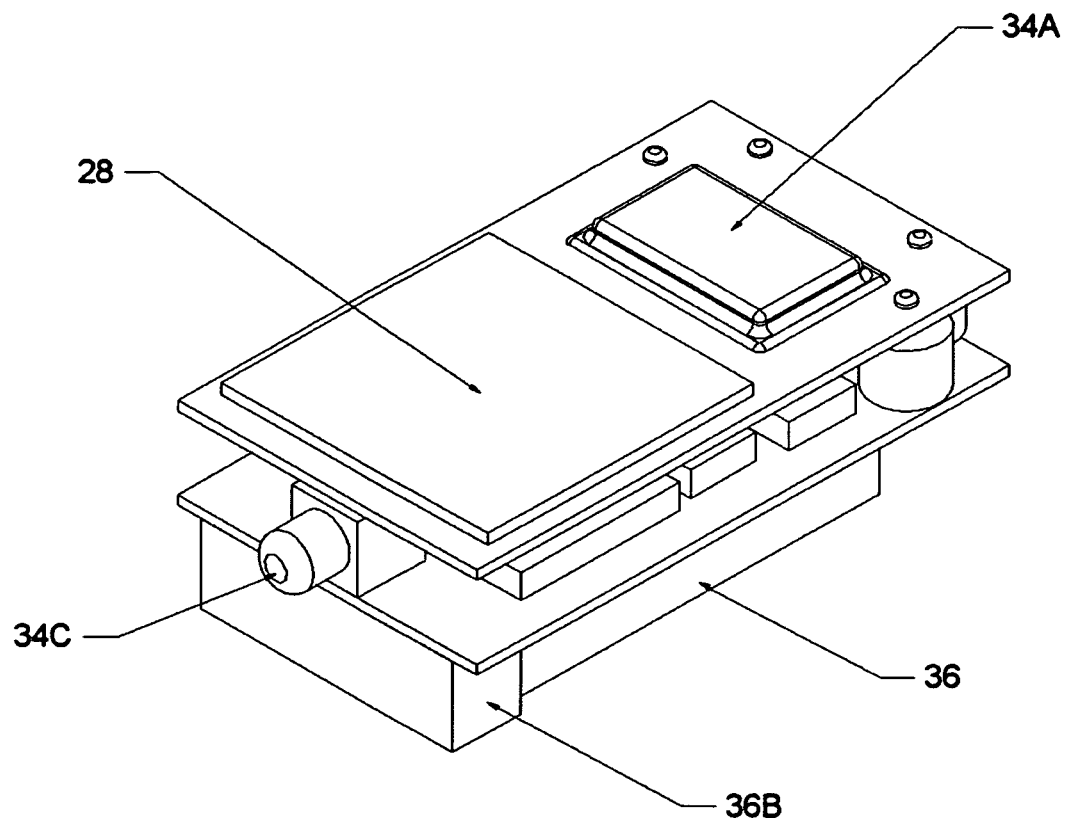
FIG. 10 is a perspective front view of the portable device in closed manner, in accordance with the preferred embodiment of the subject invention.

In accordance with the subject invention, FIG. 1 shows a general embodiment of system 200, FIG. 2 shows an alternative embodiment as system 2, and FIG. 5A shows the preferred embodiment of system 200 with components and data flow. For complete comprehension of FIGS. 1, 2 and 5A, certain terms, phrases and expressions employed are defined as follows:

Each commercial transaction comprises, by definition, an offer, acceptance and executes or closes for a determined amount of consideration (in dollars and cents), and thus has a value (plus or minus, as in credit or debit), an amount in units of fractional currency (i.e., dollars and cents) comprising purchase price minus coupons other sales deductions, plus tax, (as the specific case may be), and a transaction-indicative element identifying the transaction as, e.g., goods (and the specific type or code number) and quantity).

Accordingly, system 200 generates, records, retrieves, maintains and transfers (at different stages) "system data," comprising at least three types per portable device: (1) "cre-bit"-type data generated per transaction and representing the value and amount of that transaction; (2) account balance-type data representing the net sum of all "cre-bit" data generated for all commercial transactions on that device; and (3) transactional-type data generated per transaction representing the transaction-indicative element.

Additionally, the commercial transactions comprise at least two: one a credit-type transaction preferably executing with a quantity of physical, fractional currency, and the other a debit-type transaction executing without physical fractional currency. Observably, the credit-type transaction can execute with a check, credit or other modality, but the preferred credit-type transaction herein involves physical fractional currency (i.e., paper and coinage), and more preferably physical fractional metallic currency (i.e., coinage).

Returning to FIG. 1, merchant (hosting the system), acting as a "sponsoring company," offers SVC-type portable device(s) at step 202 to one or more consumer(s). The merchant, in this scenario is considered a "sponsoring company" as that term has been defined by the Federal Reserve as it is operating as a virtual bank, providing to the consumer the device at step 202 which operates in accordance with the inventive to provide the full gamut of commercial transactions services, earmarked in FIG. 1.

In particular, the merchant is interfaced with a bank 4, at which the merchant maintains a demand deposit account 4A, with a balance that is positively effected by initial transactions, loads and reloads. In consideration of the recognition by the Federal Reserve that merchants may be "sponsoring companies" it is within the purview of the subject invention to provide an interface between portable devices and individual accounts per device with a bank 4 as an option, and not a requirement. Should the option be invoked, then the fractional-reserve banking component of the instant invention is also enhanced as detailed in prior filings and issued patent, incorporated by reference, hereinabove. However, in accordance with the preferred embodiment, the merchant does select to interface portable devices with specific bank-maintained accounts, and thus the merchant remains a "sponsoring company" not subject to Regulation D but compliant with Regulation E's requirement of consumer disclosure, providing to the consumer commercial transactions and services, which may be part or all of those shown in FIG. 1, which, in the preferred embodiment (see, e.g., FIG. 5A) comprise general spending and purchases for goods or services, intra-merchant, as shown by box 212, in FIG. 1. Optionally, but not preferentially, other services to the consumer include: government benefits (like government checks or payments) via step 214, check cashing and/or writing via step 216, child support payments or receipts via step 218, credit functions via step 220, savings abilities via step 222, insurance abilities via step 224, ATM, money transfers and/or travelers' checks via step 225, employee related benefits (like payroll and employee payments, loan receipts and all other "payroll card functions") via step 226, and any other category of banking-related services via miscellaneous provision at step 228.

At step 204, customer procures the portable device as an initial transaction with a quantity of physical fractional currency, in accordance with the preferred embodiment of the subject invention. Thereupon, "cre-bit"-type data is generated and transferred to the bank for for increasing the balance of the bank account at step 302A, complete system data is transferred to merchant-based virtual account (which records and maintains all transactions) 207, which in turn transfers that system data to the portable device to enable it to provide statement, equivalents, transactions, histories and balances at step 208.

Thereupon merchant and customer perform additional commercial transactions at step 206, permitted as long as balance-type data is >0 (meaning the balance is larger than the transaction) determined at step 210, and system data for each transaction is transferred at step 302 back to the device at 208. As a reloadable SVC-type device and system, load/reload option is provided at step 209 to add further funds to the balance, and when that commercial transaction occurs, full system data is sent via step 302 to virtual account means 207, and as well "cre-bit"-type data only is sent via step 302A to the bank for deposit in the demand deposit account 4A. In this manner, observably, the demand deposit account balance increases and does not decrease for each subsequent commercial transaction, while the virtual account logs and tracks all transactions.

In accordance with the subject invention, FIG. 2 shows an alternative embodiment of system as item 2, wherein banking institution 4, has demand deposit account (1) (which correlates with 4A in FIG. 1), and optionally has demand deposit account (2), which is specific to the portable device 8. In this manner, certain transactions are logged by each of two captive accounts, via transmissions 7, with a virtual account 207 maintaining full records for commercial transactions 502. Indeed, despite the fact that transactions occur between two accounts, where the two accounts are with the same merchant and/or bank, the underlying currency merely moves from one location to another, but remains intra-bank 4 (or intra-merchant, as the case may be). In this manner, the actual asset base of the bank remains unchanged, while the currency moves between accounts. Thus, the fractional-reserve banking remains unchanged, despite the differences between account balances, as the asset base of the bank is not depleted with such transactions, thereby achieving a hereinbefore indicated objective and feature of the invention set forth.

It should be appreciated, however, in FIG. 2, that should demand deposit account (2) not be provided, then the system as shown will be the same as the preferred embodiment of the subject invention, as shown in further detail in FIG. 5A. In this regard, portable device 8 accommodates the preferred SVC-styled modality, with amounts (like a gift card or stored value card) but otherwise significantly improved and dissimilar for all the reasons evident and discussed. Once acquired, it is used with one or more of node devices 10.

Communication between node device 10 and banking institution 4 is determined based upon an encrypted interface 1 (item 20), and can be achieved through the Internet, telephone system, intranet or any other suitable means known to one of skill in the art. As with encrypted interface 1 (20), node device 10 communicates with portable device 8 through encrypted interface 2 (item 22). It should be appreciated that portable device 8 communicates in close proximity, utilizing a limited power output, to node device 10. With a limited dispersive angle transceiver mechanism in portable device 8 and low power output, limited power is used, and the device 8 must be proximate to the receiver for communications to occur, thereby enhancing privacy. As indicated, Bluetooth® is a preferred encryption and communication modality, although other such modalities may be used provided the specifications are compatible with the underlying letter and spirit of the claimed invention.

Node device 10 takes the form of a multiplicity of transactional devices, preferably a POS device. Clearly, each person has a portable device 8 and an associated account with the merchant and optionally but not preferrably banking institution 4 to enable a multiplicity of transactions to occur via node device 10, without depleting the asset base of banking institution 4 (when optionally secured) while permitting commercial transactions.

Figure 3:
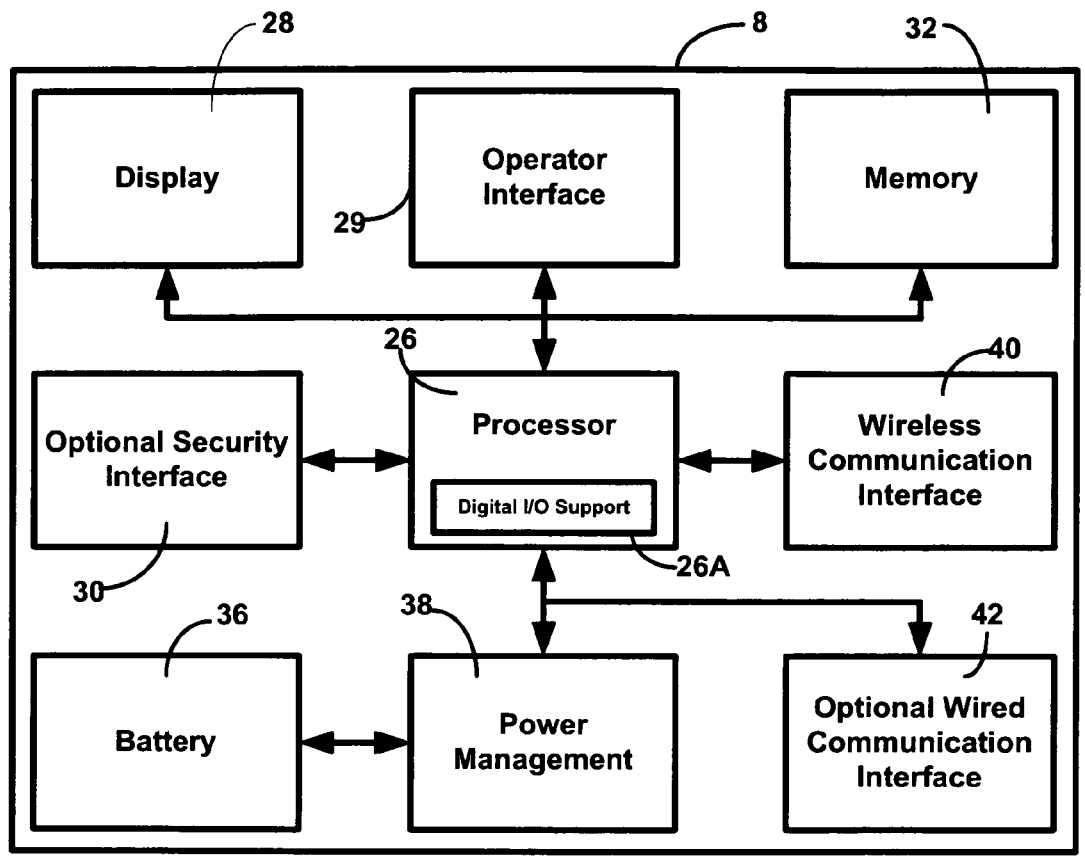
FIG. 3 is a block diagrammatical view of components comprising the portable "cre-bit" device means in accordance with the preferred embodiment of the subject invention.

FIG. 3 shows a component design for portable device 8, in accordance with a preferred embodiment thereof. In particular, processor 26 is provided with digital input/output ("I/O") support 26 A for interfacing with optional security interface 30 (like a biometric or other device), wireless communication interface 40 (for Bluetooth®, for example), power management 38 for controlling power usage and supply, battery 36 and optional wired communication interface 42 (like an IEEE 1394, USB, or the like). On the other hand, processor 26 also engages display 28 for interfacing with the user, operator interface 29 (like a wheel, pushbuttons, keypad, and the like) and memory 32. In this manner portable device 8 is rendered fully operational. It should be appreciated that display 28 is an "on demand" feature of portable device 8, permitting the customer, through the operator interface 29, to not only immediately know the account balance, but to see the list of transactions that have occurred. In this manner, the heretofore long felt need of the Federal Reserve to provide transactional information to the consumer and merchant (a/k/a "sponsoring company") with or without the bank, is resolved.

Figure 4:
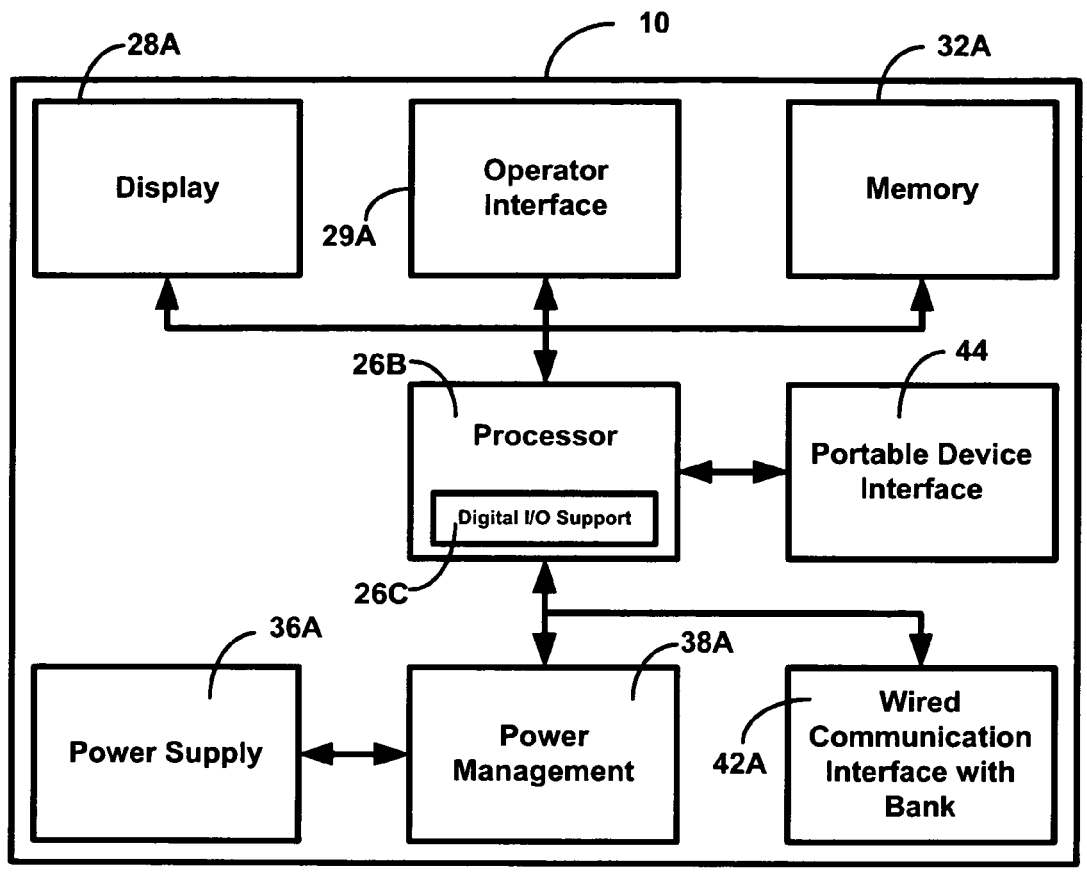
FIG. 4 is a block diagrammatical view of components comprising the node device means in accordance with the preferred embodiment of the subject invention.

FIG. 4 shows a component design for node device 10, having similarly named components to that shown in FIG. 3. It should be appreciated that while the selection of individual components for portable device 8 require consideration of power consumption in order to enable a more efficient use of battery 36, in node device 10, it is assumed that power supply 36A is employed which can be wired to a 110v wall current hence rendering power consumption of less concern. In FIG. 4, there is shown processor 26B, digital I/O support 26C, power management 38A, wired communication interface with bank 42A, and portable device interface 44, which, function in accordance with the indicated naming. Likewise, processor 26B engages display 28A for interface with the operator via operator interface 29A which can be a keyboard, and memory 32A. It should be appreciated that memory in portable device 8 as well as node device 10 renders the account and transactional information concomitant with that stored in banking institution 4 (FIG. 2).

FIG. 5 shows a flow chart (schemata) for the protocol of portable device 8 to node device 10. The flow commences with power-save mode 46 (and ends at the same point). If radio frequency activation occurs (as in automatic, close proximity to node device 10, thereby automatically engaging), power on occurs at step 50. Likewise, if button activation is selected at step 52 for portable device 8, power on occurs at step 50, and validation of biometric information occurs at step 52. It should be appreciated that other forms of validation can be employed, including entry of a code. In either respect, once power is on, the network is established to receive discovery packets at step 51. Thereupon packets are sent at step 54, reply packets are awaited at step 56, received at step 58, and protocol start messages are sent at step 60. Server information and public keys are thereupon received at step 62, with a reception of encryption start packet at step 64, and reception of transaction information in encrypted form at step 66. Client encryption keys are engaged at step 68, encryption package sent started at step 72, and a waiting for button step occurs at step 79. At this point, validation occurs at step 74 (if not theretofore), account information, user identification and data, in encrypted form, are sent at step 76, reply is awaited at step 78, transaction acknowledgment received at step 80, display is updated with the transaction results at step 82, and LED is lit at 84 indicating a completed transaction at step 84, the network is closed at step 86, and the device return to power-save mode at step 46.

FIG. 5A shows system 200 in its preferred embodiment, comprising portable device 8, node device 10, communications means 22 therebetween for transferring system data 302, and virtual account means 207, all located within the merchant venue. Portable device 8 comprises components 46, power save mode, which interfaces with validation 52 (biometric or other), and if validated, prompts the user to choose a function at 70A, which includes displaying data at 82, or transacting commercial transactions which feeds data to communication means 22. Node device 10 includes POS 16 and cash drawer 16A. POS 16 is used for commercial transactions 502, including purchase/reload which is the sole transaction that uses physical fractional currency, and hence places the same in cash drawer 16A, triggers "cre-bit"-type system data 302A to be transmitted via wire 7 to Federal Reserve Bank 4, wherein merchant's demand deposit account 4A, and wherein the balance is increased in accordance with said data 302A.

Each time a commercial transaction occurs in system 200 as shown in FIG. 5A, node device 10 engages merchant network 20 to transfer all system data 302 to virtual account 207, for recordation as in T1, T2, T3, and T4 (by example). As indicated, system data 302 comprises "cre-bit"-type 302A, account balance-type 302B and transactional type-302C.

FIGS. 6, 7, 8, 9 and 10 show exploded perspective views of portable device 8 with the components laid thereupon, conforming with the numbers indicated above. In this preferred embodiment, 26 is a processor with memory, 40 a Bluetooth® chip, 38 a power management chip, 26A a digital I/O chip, 28 a display (in this instance LCD), with optional biometric interface to 34A a button (mouse-type), 34C an LED, 42 a USB interface, 34 B a thumbwheel, 36A power inlet for charging the battery, 36B a battery connector, and 36 a battery.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A system in a merchant venue for the performance of virtual banking and for the execution of commercial transactions through at least one demand deposit account (having a balance) hosted by a bank within the Federal Reserve System, the system configured such that the demand deposit asset base of the bank is only increased and such that the system operates as a platform for receipt of physical, fractional currency, and in which each of such commercial transactions comprises a value, an amount in units of fractional currency, and a transaction-indicative element, the system comprising:

(a) at least one node device, configured to successively validate and execute upon such commercial transactions, generate system data corresponding therewith, transmit system data to a computer-hosted virtual account in a merchant network configured to receive, record, and maintain said data, and transmit certain of the system data to the bank to increase the demand deposit account balance, said system data comprising:

(1) "cre-bit" data per commercial transaction, corresponding with each transaction's value and amount;
(2) account balance data per all commercial transactions, corresponding with the net sum of all "cre-bit" data therefrom; and
(3) transactional-type data per commercial transaction, representing each transaction's transaction-indicative element;

(b) at least one portable "cre-bit" device configured to cooperatively engage said at least one node device and to successively validate and execute upon at least one of such commercial transactions, said "cre-bit" device further configured to record and display at least a portion of said system data on-demand; said at least one portable "cre-bit" device comprising a microprocessor, display means for displaying said at least a portion of said system data, operator interface means for validating and executing said successive commercial transactions, power, and memory;

(c) communication means for securely communicating said system data between said at least one node device and said at least one portable "cre-bit" device;

(d) a credit-type commercial transaction function, comprising:
(1) validative communication between at least one of each of said respective "cre-bit" and node devices for transfer of system data therebetween; and
(2) said node device generated system data representing said transaction with a value of positive and an amount in units equivalencing the physical fractional currency, for transfer of:
(a) said "cre-bit" data to the bank such that said demand deposit account balance and, thereby, the demand deposit asset base of the bank, increase by said amount; and
(b) said "cre-bit" and transactional-type data to said virtual account for recordation; and
(c) at least a portion of said "cre-bit" and transactional-type data to said "cre-bit" device for recordation and on-demand display; and (e) a debit-type commercial transaction function, comprising:
(1) validative communication between at least one of each of said respective "cre-bit" and node devices for transfer of system data therebetween; and
(2) said node device generated system data representing said transaction with a value of positive and an amount in units equivalencing the physical fractional currency, for transfer of:
(a) no portion of said "cre-bit" data to the bank such that said demand deposit account balance and, thereby, the demand deposit asset base of the bank is unchanged; and
(b) said "cre-bit" and transactional-type data to said virtual account for recordation; and
(c) at least a portion of said "cre-bit" and transactional-type data to said "cre-bit" device for recordation and on-demand display.

2. The system of claim 1, wherein said communication means is wireless.

3. The system of claim 1, wherein said operator interface means further comprises operator identity verification means, operatively engaged in advance of execution of at least one of said commercial transactions.

4. The system of claim 1, wherein a first of said commercial transactions is a credit-type commercial transaction constituting a sale of the "cre-bit" means.

5. The system of claim 1, wherein said commercial transactions are selected from the group consisting of general spending and purchases, government benefits, check cashing, child support payments and receipts, credit functions, savings functions, insurance functions, ATM functions, money transfers, travelers' checks, electronic and paper check writing, employee related functions, miscellaneous functions, fractional currency deposits and withdrawals, and combinations thereof.

6. The system of claim 1, wherein one of said commercial transactions is a credit-type commercial transaction and constitutes a reloading transaction.

7. The system of claim 1, wherein one of said commercial transactions is a debit-type commercial transactions and constitutes the sale of goods resulting in a decrease in the account balance data recorded by said virtual account and a zero change in the bank-captive, merchant account balance.

8. The system of claim 1, wherein one of said commercial transactions is a debit-type commercial transaction and constitutes the sale of services resulting in a decrease in the account balance data recorded by said virtual account and a zero change in the bank-captive, merchant account balance.

9. The system of claim 1, wherein validation of said plurality of successive commercial transactions is determined by maintaining said account-balance type system data >0.

10. A method for providing a plurality of successive commercial transactions including virtual banking in a merchant venue in a manner which serves to increase the demand deposit asset base of at least one bank within the Federal Reserve System having a bank-captive, merchant account with a balance, comprising:
   (a) recording, retrieving and maintaining system data representing said commercial transactions in a merchant-captive, computer-hosted, virtual account means, where each transaction comprises a value, an amount in units of fractional currency, and a transaction-indicative element, said system data comprising, by type: (1) "cre-bit"-type data generated per transaction and representing its value and amount; (2) account balance-type data representing the net sum of all "cre-bit" data generated for all said commercial transactions; and (3) transactional-type data generated per transaction representing the transaction-indicative element; wherein at least one of said commercial transactions is a credit-type transaction executing with a quantity of physical, fractional currency, and at least another of said commercial transactions is a debit-type transaction executing without physical fractional currency;
   (b) successively validating and executing upon each of said commercial transactions and receiving, recording and on-demand displaying at least a portion of said system data, by way of portable "cre-bit" means;
   (c) successively validating and executing upon each of said commercial transactions, generating said system data, and selectively communicating type-specific system data for receipt and recordation by each of said bank-captive merchant account, said virtual account means and said "cre-bit" means, by way of node means in the merchant venue;
   (d) securely communicating said system data between said "cre-bit" and "node" means by way of communication means;
   (e) upon transacting and executing only a credit-type commercial transaction:
      (1) securely communicating system data between said respective "cre-bit" and node means; and
      (2) generating system data representing said transaction with a value of positive and an amount in units equivalencing the physical fractional currency upon said node means, and transferring:
         (a) said "cre-bit"-type system data to said at least one bank such that said captive account balance therein is increased by said amount thereby increasing the demand deposit asset base of that bank;
         (b) said "cre-bit"-type system data to said virtual account means such that said account-balance type system data is modifiedly increased by said amount;
         (c) said transactional-type system data to said virtual account means such that said transaction-indicative element is recorded; and
         (d) via said communication means, at least a portion of said "cre-bit"-type system data, modified account-balance type system data, and transactional-type system data to said "cre-bit" means for recordation and on-demand display; and
   (f) upon transacting and executing only a debit-type commercial transaction:
      (1) securely communicating system data said between said respective "cre-bit" and node means; and
      (2) generating system data with a value of negative and the amount in units of fractional currency for that commercial transaction upon said node means, and transferring:
         (a) said "cre-bit"-type system data to said virtual account means such that said account-balance type system data is modifiedly increased by said amount;
         (b) said transactional-type system data to said virtual account means such that said transaction-indicative element is recorded; and
         (c) via said communication means, at least a portion of said "cre-bit"-type system data, modified account-balance type system data, and transactional-type system data to said "cre-bit" means for recordation and on-demand display.

11. The method of claim 10, wherein said debit-type commercial transactions constitute the sale of goods each resulting in a decrease in the account-balance type system data recorded by said merchant-captive, computer-hosted, virtual account means and a zero change in the bank-captive, merchant account balance.

12. The method of claim 10, wherein said debit-type commercial transactions constitute the sale of services resulting in a decrease in the account-balance type system data recorded by said merchant-captive, computer-hosted, virtual account means and a zero change in the bank-captive, merchant account balance.

13. The method of claim 10, wherein validation of said plurality of successive commercial transactions is determined by maintaining said account-balance type system data >0.

* * * * *